US012704675B2

(12) United States Patent
Tseng et al.

(10) Patent No.: US 12,704,675 B2
(45) Date of Patent: Aug. 11, 2026

(54) OPTICAL INTERPOSER STRUCTURE AND METHOD

(71) Applicant: Taiwan Semiconductor Manufacturing Company, Ltd., Hsinchu (TW)

(72) Inventors: Chih-Wei Tseng, Hsinchu (TW); Hsing-Kuo Hsia, Hsinchu County (TW); Stefan Rusu, Sunnydale, CA (US); Chen-Hua Yu, Hsinchu (TW); Chewn-Pu Jou, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 560 days.

(21) Appl. No.: 18/154,687

(22) Filed: Jan. 13, 2023

(65) Prior Publication Data

US 2024/0077670 A1 Mar. 7, 2024

Related U.S. Application Data

(60) Provisional application No. 63/425,626, filed on Nov. 15, 2022, provisional application No. 63/403,136, filed on Sep. 1, 2022.

(51) Int. Cl.

| | |
|---|---|
| ***G02B 6/12*** | (2006.01) |
| ***G02B 6/13*** | (2006.01) |
| ***G02B 6/43*** | (2006.01) |

(52) U.S. Cl.
CPC .......... *G02B 6/12004* (2013.01); *G02B 6/13* (2013.01); *G02B 6/43* (2013.01)

(58) Field of Classification Search
CPC ........ G02B 6/43; G02B 6/13; G02B 6/12004; G02B 6/136; G02B 6/132; G02B 6/428
See application file for complete search history.

(56) References Cited

U.S. PATENT DOCUMENTS

| | | | |
|---|---|---|---|
| 9,742,497 | B2 | 8/2017 | Yu |
| 9,864,133 | B2 | 1/2018 | Patel |

(Continued)

FOREIGN PATENT DOCUMENTS

| | | | |
|---|---|---|---|
| CN | 112530925 | A | 3/2021 |
| CN | 114222939 | A | 3/2022 |

(Continued)

OTHER PUBLICATIONS

Takafumi Fukushima et al., Oxide-Oxide Thermocompression Direct Bonding Technologies with Capillary Self-Assembly for Multichip-to-Wafer Heterogeneous 3D System Integration, Micromachines 2016, 7, 184; doi:10.3390/mi7100184, pp. 1-18.

(Continued)

*Primary Examiner* — Michael P Mooney
(74) *Attorney, Agent, or Firm* — HAYNES AND BOONE, LLP

(57) ABSTRACT

A semiconductor structure includes an optical interposer having at least one first photonic device in a first dielectric layer and at least one second photonic device in a second dielectric layer, wherein the second dielectric layer is disposed above the first dielectric layer. The semiconductor structure further includes a first die disposed on the optical interposer and electrically connected to the optical interposer; a first substrate under the optical interposer; and conductive connectors under the first substrate.

20 Claims, 28 Drawing Sheets

(56) References Cited

U.S. PATENT DOCUMENTS

| | | | | |
|---|---|---|---|---|
| 10,393,959 | B1 * | 8/2019 | Razdan ................ | G02B 6/1225 |
| 10,971,477 | B2 | 4/2021 | Yu | |
| 11,531,159 | B2 | 12/2022 | Chern | |
| 2006/0056756 | A1 | 3/2006 | Uchida | |
| 2018/0013017 | A1 | 1/2018 | Yu | |
| 2021/0271020 | A1 | 9/2021 | Islam | |

FOREIGN PATENT DOCUMENTS

| | | | |
|---|---|---|---|
| KR | 20200008112 | B1 | 1/2020 |
| KR | 20210034512 | A | 3/2021 |
| KR | 20210132176 | A | 11/2021 |
| TW | 202017195 | A | 5/2020 |
| TW | 202212879 | A | 4/2022 |
| TW | 202213711 | A | 4/2022 |

OTHER PUBLICATIONS

Coherent, Thin Wafer Laser Debonding—Fast and Without Fuss, White Paper, pp. 1-4.

* cited by examiner 160
150
310
302
318
316
314
312
50
100
304

160
310
150
312
314
316
318
50
304
100
216
214
212
210
202
204
60

216
214
212
318
316
314
312
302
210
310
100
204
304
50

100
304
310
320
312
314
316
318
302
50

100
204
304
210
310
222
320
312
314
316
318
212
214
216
302
50

OPTICAL INTERPOSER STRUCTURE AND METHOD

PRIORITY

This application claims the benefits of U.S. Prov. App. Ser. No. 63/403,136, filed Sep. 1, 2022 and U.S. Prov. App. Ser. No. 63/425,626, filed Nov. 15, 2022. The entire disclosure of these applications is incorporated herein by reference.

BACKGROUND

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Implementation and operation of optical data communication systems is dependent upon having reliable and efficient mechanisms for transmitting laser light and receiving laser light.

Sometimes, the sending and receiving nodes in an optical data network may be interconnected through an interposer, and the optical signal (i.e., light) is transmitted through the interposer. Such interposer may be referred to as an optical interposer. Using optical interposers may reduce the length of the optical path and improve the optical signal integrity. It also enables low-cost integration of opto-electronic devices. Optical interposers that can improve the integration of chips and systems and are compatible with CMOS manufacturing processes are desired.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only except explicitly disclosed. In fact, the dimensions of the various features may be arbitrarily increased or reduced for clarity of discussion.

DETAILED DESCRIPTION

Figure 1:
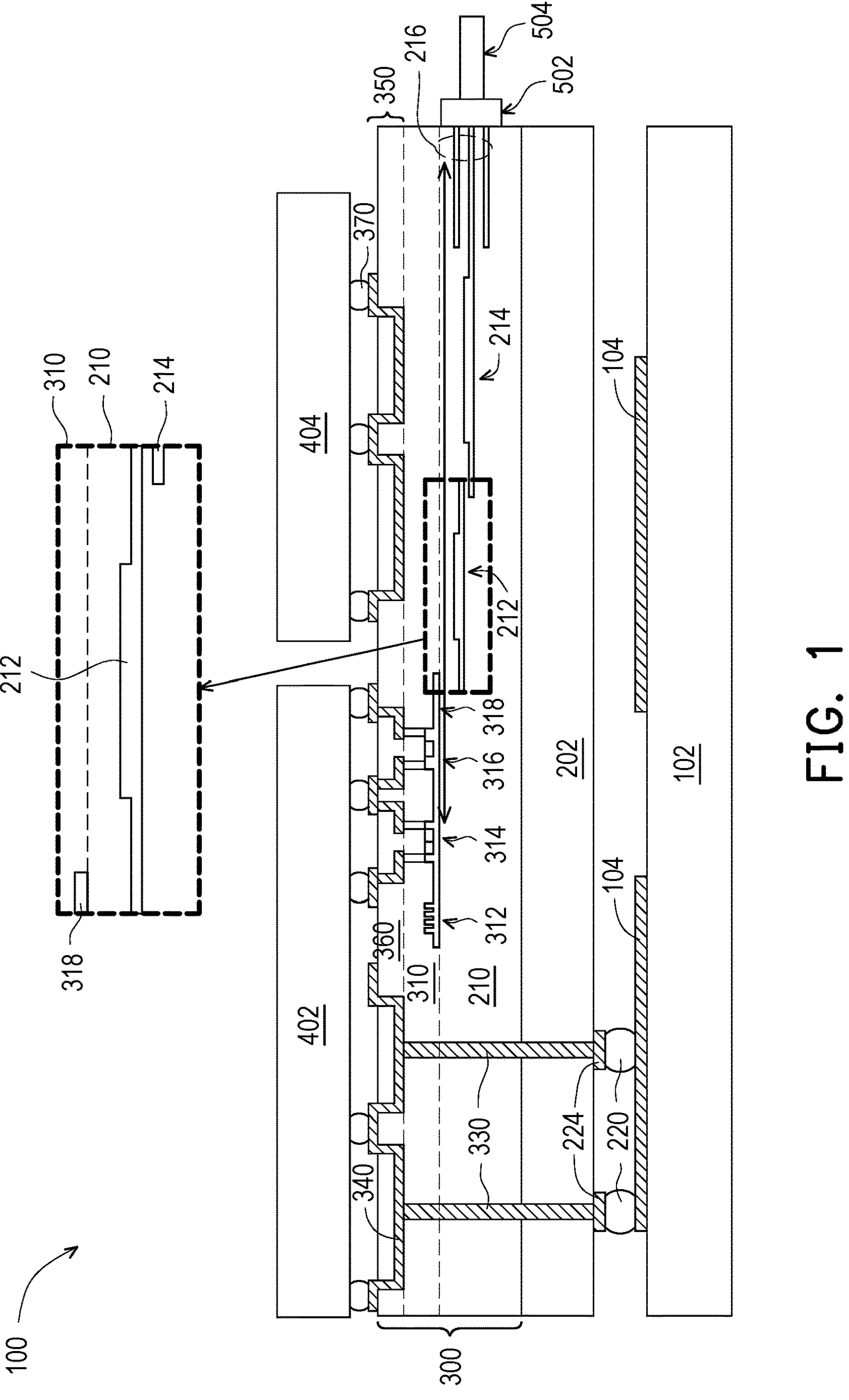
FIGS. 1, 2, and 3 illustrate partial, simplified cross-sectional diagrams of a semiconductor structure or system with an optical interposer according to embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Further, when a number or a range of numbers is described with “about,” “approximate,” and the like, the term is intended to encompass numbers that are within a reasonable range considering variations that inherently arise during manufacturing as understood by one of ordinary skill in the art. For example, the number or range of numbers encompasses a reasonable range including the number described, such as within +/−10% of the number described, based on known manufacturing tolerances associated with manufacturing a feature having a characteristic associated with the number. For example, a material layer having a thickness of “about 5 nm” can encompass a dimension range from 4.25 nm to 5.75 nm where manufacturing tolerances associated with depositing the material layer are known to be +/−15% by one of ordinary skill in the art.

The present disclosure relates generally to opto-electronics systems and particularly to a semiconductor structure or an opto-electronics system having an optical interposer and the methods thereof.

Optical data communication systems operate by modulating laser light to encode digital data patterns. The modulated laser light is transmitted through an optical data network from a sending node (e.g., an optical transmitter) to a receiving node (e.g., an optical receiver). The modulated laser light having arrived at the receiving node is demodulated to obtain the original digital data patterns. Implementation and operation of optical data communication systems depend on having reliable and efficient mechanisms for transmitting laser light and detecting laser light at different nodes within the optical data network.

Sometimes, the sending and receiving nodes in an optical data network may be interconnected through an interposer, and the optical signal is transmitted through the interposer. Such interposer may be referred to as an optical interposer. Using optical interposers may reduce the length of the optical path and improve the optical signal integrity. Some optical interposers do not have opto-electronic structures (such as grating couplers, optical modulators, photo detectors, etc.) within them. Rather, such opto-electronic structures are provided inside chips disposed on the optical interposers, and the optical interposers are optically coupled with the chips through vertical optical paths for transmitting and/or receiving optical signals (e.g., in the form of modulated light). Having to provide vertical optical paths sometimes limits the way that the optical interposers are integrated with the chips. For example, it may limit the mechanisms of bonding and connecting the optical interposers with the chips. Sometimes, it may require lens and mirrors to be coupled to or integrated with the optical interposers, which presents some difficulty for existing CMOS manufacturing processes. Some embodiments of the present disclosure resolve these and other issues by providing optical interposers that are compatible with existing CMOS manufacturing processes and are flexible when integrating with other structures, such as integrated circuit chips and dies.

According to some embodiments of the present disclosure, an optical interposer has optical structures or optical devices (such as photonic modulators, photo detectors, waveguides, grating couplers, edge couplers, other optical elements, or a combination thereof) integrated therein. The functions of electrical to optical conversion and optical to electrical conversion are done within the optical interposer and by the optical structures stated above. The optical interposer is electrically connected to integrated circuit chips and/or dies (referred to as dies hereinafter) thereon. In some embodiments, the interfaces between the optical interposer and the dies are electrical only and are free of optical interfaces. By having only electrical interfaces between the optical interposer and the dies, lens and mirrors (which may be difficult to make in silicon planar processes) may be avoided in the optical path. In other words, the semiconductor structure according to embodiments of the present disclosure is more compatible with silicon CMOS processes than those utilizing lens and mirrors. Further, since the interfaces between the optical interposer and the dies are electrical only, the optical interposers can be flexibly integrated with dies using existing interconnect technologies, including hybrid-bond, controlled collapse chip connection (C4) bumps, and micro bumps.

Furthermore, the optical interposer according to embodiments of the present disclosure may include multiple dielectric layers (e.g., each having primarily silicon dioxide) and each dielectric layer has optical structures embedded therein. In an embodiment, the various dielectric layers are bonded together, which increases the flexibility of integrating different types of photonic devices into the optical interposer. For example, one dielectric layer may include silicon-based photonic devices embedded therein and another dielectric layer may include silicon nitride-based photonic devices embedded therein. The two dielectric layers including the photonic devices therein are manufactured separately and bonded together. By manufacturing them separately, the manufacture cycle time and the product's time-to-market can be shortened. Integrating both into the same optical interposer improves functionality, performance, and reliability of the optical interposer. For example, silicon nitride-based photonic devices (such as waveguides and edge couplers) are less sensitive to temperature variations. In an alternative embodiment, the multiple dielectric layers (including photonic devices therein) in the disclosed optical interposer are manufactured sequentially one over another. In such embodiment, bonding of the multiple dielectric layers is avoided and more precise vertical alignment among photonic structures may be achieved. After the dielectric layers including photonic devices therein are fabricated, a redistribution layer (RDL) having metallization patterns (such as metal pads, traces, and vias) is formed on the dielectric layers. The RDL provides electrical connectivity to the dies on the optical interposer. The RDL may also provide electrical connectivity to the optical structures inside the dielectric layers of the optical interposer. These and other aspects are further explained with reference to the accompanied drawings.

Referring to FIG. 1, shown therein is a semiconductor structure 100 (or a system 100) according to embodiments of the present disclosure. The semiconductor structure 100 includes a substrate (or base substrate) 102. In an embodiment, the substrate 102 may include an organic material and be referred to as an organic substrate 102. For example, the substrate 102 may include a printed circuit board (PCB) such as FR4 PCB. FR4 is a class of PCB base material made from a flame retardant epoxy resin and glass fabric composite. In some embodiments, the substrate 102 may include an organic dielectric material, such as a polymer, which may include polyimide, polybenzoxazole (PBO), benzocyclobutene (BCB), other suitable polymer-based material, or combinations thereof. The substrate 102 further includes metallization patterns 104 (such as metal traces, metal pads, and metal vias) on or in the organic material(s). The metallization patterns 104 may comprise a metal or a metal alloy, such as copper, titanium, tungsten, aluminum, the like, or combinations thereof, and may be formed using deposition and patterning processes.

The semiconductor structure 100 further includes another substrate 202. In an embodiment, the substrate 202 is a semiconductor substrate, such as a silicon substrate (e.g., a silicon wafer or a part thereof). Additionally, or alternatively, the substrate 202 may include other semiconductor materials, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. Other substrates, such as multi-layered or gradient substrates, may also be used as the substrate 202. In some embodiments, the substrate 202 may include a glass substrate or a ceramic substrate.

The substrate 202 and the substrate 102 are electrically and mechanically coupled or connected by way of conductive connectors 220. The conductive connectors 220 may be BGA connectors, solder balls, metal pillars, C4 bumps, micro bumps, electroless nickel-electroless palladium-immersion gold technique (ENEPIG) formed bumps, or the like. The conductive connectors 220 may be formed of a metal or metal alloy, such as solder, copper, aluminum, gold, nickel, silver, palladium, tin, the like, or a combination thereof. In some embodiments, the conductive connectors 220 are formed using methods such as evaporation, sputtering, electroplating, electroless plating, printing, solder transfer, ball placement, reflow, or the like. The conductive connectors 220 are connected to conductive pads (or under bump metallurgies) 224 on the bottom surface of the substrate 202 and are connected to the metallization patterns 104 on the top surface of the substrate 102.

Still referring to FIG. 1, the semiconductor structure 100 further includes an optical interposer 300 on the substrate 202. In the illustrated embodiment, the optical interposer 300 includes a dielectric layer 210, a dielectric layer 310 on the dielectric layer 210, and an RDL 350 on the dielectric layer 310. The optical interposer 300 includes optical structures 212, 214, and 216 in the dielectric layer 210, and further includes optical structures 312, 314, 316, and 316 in the dielectric layer 310. The RDL 350 include metallization patterns 340 (e.g., metal pads, metal traces, and/or metal vias) in and/or on dielectric layer(s) 360. These elements are further described below. The optical interposer 300 may include other optical structures in the dielectric layers 210 and 310 that are not shown in FIG. 1.

In an embodiment, the dielectric layer 210 includes silicon dioxide and the optical structures 212, 214, and 216 include silicon nitride-based optical structures. In other words, the optical structures 212, 214, and 216 may utilize the differences between the refractive indexes of silicon nitride and silicon dioxide to confine and transmit light. The dielectric layer 210 may include other dielectric materials in alternative embodiments. In an embodiment, the optical structures 212 and 214 include waveguides for transmitting and receiving optical signals to and from the optical structures in the dielectric layer 310, such as the optical structure 318. In some embodiments, the optical structures 212 and 214 are disposed at different vertical levels in the dielectric layer 210. In an embodiment, the optical structure 216 may include an edge coupler for coupling the optical structure 214 (e.g., a waveguide) with a fiber array 502 that may be disposed on a side of the optical interposer 300. In an embodiment, the edge coupler 216 includes multiple layers of optical paths that provide high tolerance for alignment with the fiber array 502. The fiber array 502 may be further coupled with an optical fiber 504 for connecting with another structure or system (not shown), such as another semiconductor structure 100 or a similar structure. The fiber array 502 and the optical fiber 504 are optional and may be omitted in some embodiments.

Figure 2:
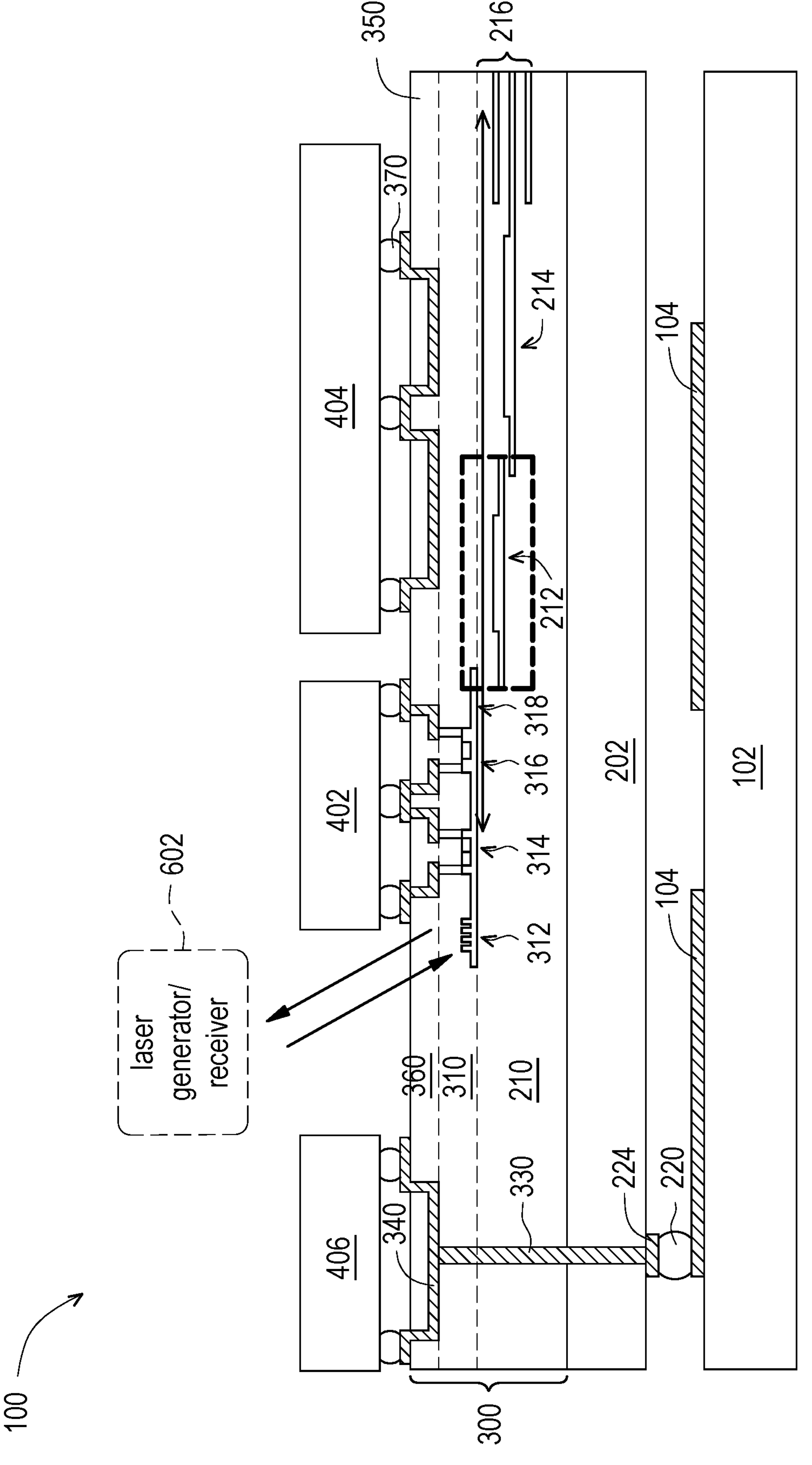

In an embodiment, the dielectric layer 310 includes silicon dioxide. The dielectric layer 310 may include other dielectric materials in alternative embodiments. In an embodiment, the optical structure 312 may include a grating coupler and be referred to as a grating coupler 312. In an embodiment, the grating coupler 312 includes several segments with a distance between each segment. The grating coupler 312 may be coupled with a laser generator and/or receiver 602 (such as shown in FIG. 2) and be configured to transform a laser signal into a modulated light signal, or vice versa. In some embodiments, the grating coupler 312 may include a metal or a dielectric material with a dielectric constant higher than that of silicon dioxide or that of the dielectric layer 310.

In an embodiment, the optical structure 314 may include a photonic modulator and be referred to as a modulator 314. In some embodiments, the modulator 314 may include silicon, germanium, tin, a group III element, such as aluminum, indium, or gallium, and/or a group V element, such as arsenic, phosphorous, antimony. In an embodiment, the modulator 314 may be configured to transform a laser signal into a modulated light signal comprising or carrying a high-speed data signal. The modulator 314 may be electrically coupled to and/or controlled by a die 402, further discussed below.

In an embodiment, the optical structure 316 may include a photo detector and be referred to as a photo detector 316. In an embodiment, the photo detector 316 may include a photo diode (or photodiode), a photo transistor, or other types of photo detectors. The photo detector 316 is configured to transform a light signal into an electrical signal. In some embodiments, the photo detector 316 may include silicon, germanium, tin, a group III element, such as aluminum, indium, or gallium, and/or a group V element, such as arsenic, phosphorous, antimony. The photo detector 316 may be electrically coupled to a die 402, further discussed below.

In an embodiment, the optical structure 318 may include a waveguide and be referred to as a waveguide 318. In an embodiment, the waveguide 318 includes a silicon waveguide, which uses the differences between the refractive indexes of silicon and the dielectric layer 310 (e.g., silicon dioxide) to confine and transmit light. In alternative embodiments, the waveguide 318 may include a dielectric waveguide or a plasmonic waveguide. A dielectric waveguide may include a patterned silicon nitride, amorphous silicon, or a high dielectric material surrounded by a low dielectric constant material of the dielectric layer 310, such as silicon dioxide. A plasmonic waveguide may include patterned metal nano wires surrounded by a dielectric material of the dielectric layer 310. Since the dielectric layer 310 is on top of the dielectric layer 210, the optical structures (including optical structures 312, 314, 316, 318) in the dielectric layer 310 are on a higher vertical level than the optical structures (including optical structures 212, 214, 216) in the dielectric layer 210. The optical interposer 300 may include many of the optical structures 312, 314, 316, and 318 in the dielectric layer 310.

As illustrated in FIG. 1, the optical interposer 300 provides optical path(s), such as bidirectional optical paths, by utilizing the optical structures in the dielectric layers 210 and 310. For example, the modulator 314 may be configured to transform an electrical signal (received from the die 402) into a modulated light signal, which is then transmitted through the waveguide 318. The waveguide 318 is coupled (e.g., edge-coupled) to the optical structure 212 (e.g., a waveguide). In an embodiment such as shown in FIG. 1, the waveguide 318 overlaps with the optical structure 212 from a top view (in other words, they are vertically overlapping with each other) so that light can be transmitted between the waveguide 318 and the optical structure 212. The optical structure 212 is in turn coupled (e.g., edge-coupled) to the optical structure 214 (e.g., another waveguide at a different level than the optical structure 212), which is in turn coupled to the edge coupler 216. From there, the modulated light signal is transmitted to other elements external to the optical interposer 300, such as the fiber array 502. Conversely, the optical structures 212, 214, and 216 may receive light signals from other elements external to the optical interposer 300 (such as through the fiber array 502) and transmit such light signals to the waveguide 318 and the photo detector 316, which then converts the light signal into an electrical signal and transmits the electrical signal to the die 402.

In an embodiment, the dielectric layer 210 and the dielectric layer 310 are bonded together using oxide-oxide bonding, and the interface between the dielectric layers 210 and 310 may be hardly detectable. This will be further discussed with reference to FIG. 7 (such as operation 710). In some embodiments, the optical interposer 300 may include additional dielectric layer(s) besides the dielectric layers 210 and 310. Further, the additional dielectric layer(s) may each include optical structures such as discussed above. Still further, the additional dielectric layer(s) may be bonded to each other and to the dielectric layers 210 and 310 using oxide-oxide bonding. This greatly increases the flexibility of creating the optical interposer 300 with desired functionality. In an alternative embodiment, the dielectric layer 210 including the optical structures 212, 214, and 216 is formed directly on the dielectric layer 310 instead of using bonding. For example, layers of materials that form the dielectric layer 210 and the optical structures 212, 214, and 216 may be deposited on the dielectric layer 310 and be subsequently processed such as by patterning, etching, and/or polishing to form the dielectric layer 210 including the optical structures 212, 214, and 216. This will be further discussed with reference to FIG. 18 (such as operations 802 and 804).

Still referring to FIG. 1, the optical interposer 300 further includes an RDL 350 on the dielectric layer 310 (which is the topmost dielectric layer having optical structures in the optical interposer 300). The RDL 350 includes one or more dielectric layers 360 and various metallization patterns 340 (e.g., metal pads, metal traces, and/or metal vias) in or on the one or more dielectric layers 360. The semiconductor structure 100 further includes conductive connectors 370 disposed on some of the metallization patterns 340. The semiconductor structure 100 further includes dies 402 and 404 disposed on the conductive connectors 370. The conductive connectors 370 and the RDL 350 electrically and mechanically connect the dies 402 and 404 to the optical structures (such as the modulators 314 and the photo detectors 316) in the optical interposer 300.

In some embodiments, the dielectric layers 360 are formed of a polymer, which may be a photo-sensitive material such as PBO, polyimide, BCB, or the like, may be patterned using a lithography mask. In other embodiments, the dielectric layers 360 are formed of a nitride such as silicon nitride; an oxide such as silicon oxide, PSG, BSG, BPSG; or the like. The dielectric layers 360 may be formed by spin coating, lamination, CVD, the like, or a combination thereof. Metallization patterns 340 may comprise a metal or a metal alloy, such as copper, titanium, tungsten, aluminum, the like, or combinations thereof, and may be formed using deposition and patterning processes.

The conductive connectors 370 may be BGA connectors, solder balls, metal pillars, C4 bumps, micro bumps, bumps formed by ENEPIG, or the like. The conductive connectors 370 may be formed of a metal or metal alloy, such as solder, copper, aluminum, gold, nickel, silver, palladium, tin, the like, or a combination thereof. In some embodiments, the conductive connectors 370 are formed using methods such as evaporation, sputtering, electroplating, electroless plating, printing, solder transfer, ball placement, reflow, or the like.

Each of the dies 402 and 404 may be bare dies, such as, logic dies (e.g., central processing unit, microcontroller, etc.), memory dies (e.g., dynamic random access memory (DRAM) die, static random access memory (SRAM) die, etc.), power management dies (e.g., power management integrated circuit (PMIC) die), radio frequency (RF) dies, sensor dies, micro-electro-mechanical-system (MEMS) dies, signal processing dies (e.g., digital signal processing (DSP) die), front-end dies (e.g., analog front-end (AFE) dies), the like, or a combination thereof.

In an embodiment such as illustrated in FIG. 1, at least the die 402 is electrically connected to the optical structures (such as the optical structures 314 and 316) in the optical interposer 300. For example, the die 402 may handle electrical signal processing while the optical interposer 300 handles the opto-electrical processing. In the cross-sectional view shown in FIG. 1, the die 404 is electrically connected to the RDL 350 but not connecting to the optical structures in the optical interposer 300. However, the die 404 may be electrically connected to the optical structures in the optical interposer 300 in some other portions of the semiconductor structure 100. Further, the optical interposer 300 provides electrical interconnections between the die 402 and the die 404, for example, through the RDL 350.

Still referring to FIG. 1, the semiconductor structure 100 further includes through vias 330. In the illustrated embodiment, the through vias 330 at least penetrate through the dielectric layers 210 and 310 and the substrate 202. The through vias 330 electrically connect the conductive pads 224 to the metallization patterns 340. The through vias 330 may include a metal or a metal alloy, such as copper, titanium, tungsten, aluminum, the like, or combinations thereof, and may be formed by plating, such as electroplating or electroless plating, or the like.

FIG. 2 illustrates another embodiment of the semiconductor structure 100. In this embodiment, the semiconductor structure 100 further includes a die 406 in addition to dies 402 and 404. The die 406 is electrically and mechanically connected to the RDL 350 by way of conductive connectors 370. The die 406 is electrically connected to the through vias 330 which are in turn electrically coupled to the conductive connectors 220 and the substrate 102. FIG. 2 further illustrates a laser generator and/or receiver 602 that may be coupled to the grating coupler 312. Other aspects of this embodiment are same as or similar to the embodiment shown in FIG. 1.

Figure 3:
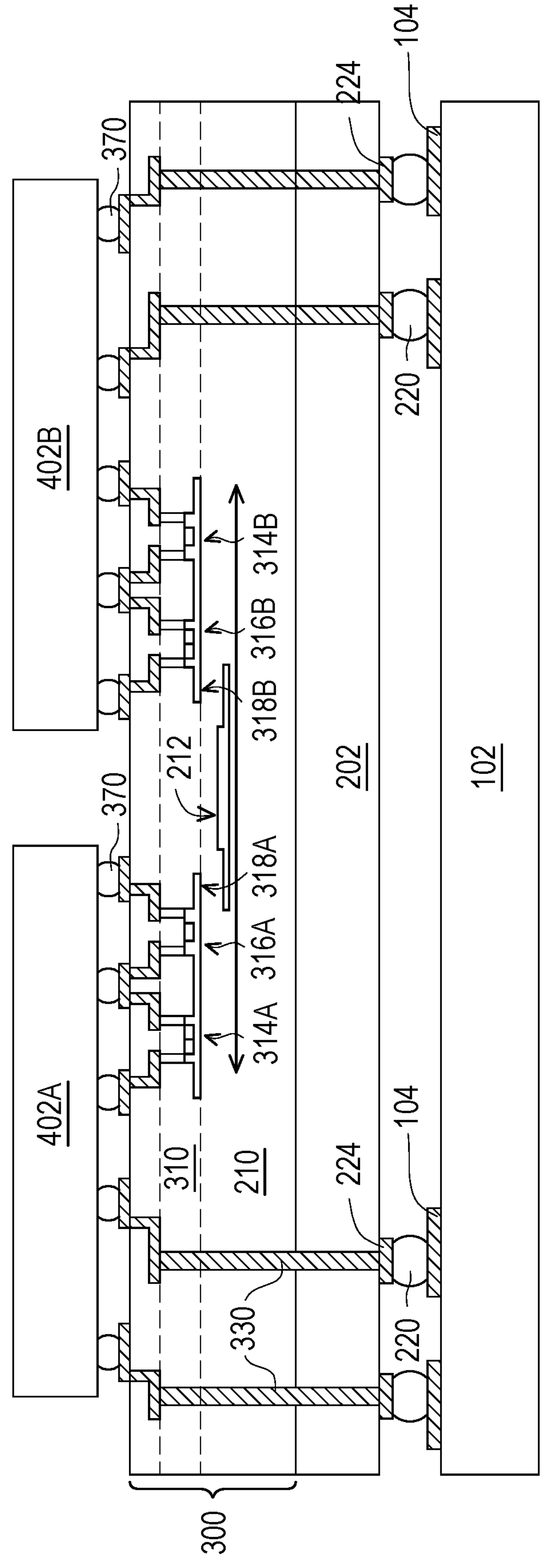

FIG. 3 illustrates yet another embodiment of the semiconductor structure 100. In this embodiment, the semiconductor structure 100 includes multiple dies 402, such as dies 402A, 402B, and so on. Each of the dies 402 is electrically coupled to the optical structures in the optical interposer 300, particularly the optical structures 314A, 316A, 314B, and 316B in the dielectric layer 310. For example, the die 402A may be electrically coupled to an optical modulator 314A and a photo detector 316A which are optically coupled to one or more waveguides 318A. Further, the die 402B may be electrically coupled to an optical modulator 314B and a photo detector 316B which are optically coupled to one or more waveguides 318B. The one or more waveguides 318A and the one or more waveguides 318B are optically coupled through one or more optical structures (e.g., waveguides) 212 in the dielectric layer 210. In an embodiment, the die 402A may transmit an electrical signal to the optical modulator 314A which then transforms the electrical signal to a modulated light signal. The modulated light signal is then transmitted to the photo detector 316B which then transforms the modulated light signal to an electrical signal and transmits the electrical signal to the die 402B. Conversely, the die 402B may transmit an electrical signal to the optical modulator 314B which then transforms the electrical signal to a modulated light signal. The modulated light signal is then transmitted to the photo detector 316A which then transforms the modulated light signal to an electrical signal and transmits the electrical signal to the die 402A. Therefore, the semiconductor structure 100 enables a bidirectional optical path between the dies 402A and 402B. In various embodiment, the semiconductor structure 100 may be configured to provide a unidirectional optical path from the die 402A to the 402B, a unidirectional optical path from the die

402B to the 402A, and/or to provide a bidirectional optical path between the dies 402A and 402B. Other aspects of this embodiment are same as or similar to the embodiment shown in FIG. 1.

In some embodiments, the semiconductor structure 100 may include two or more dies 402, 404, and/or 406 that are optically interconnected through the optical interposer 300. Some examples are further illustrated in FIGS. 4, 5, and 6. These examples demonstrate that the disclosed optical interposer enables very flexible system integration.

Figure 4:
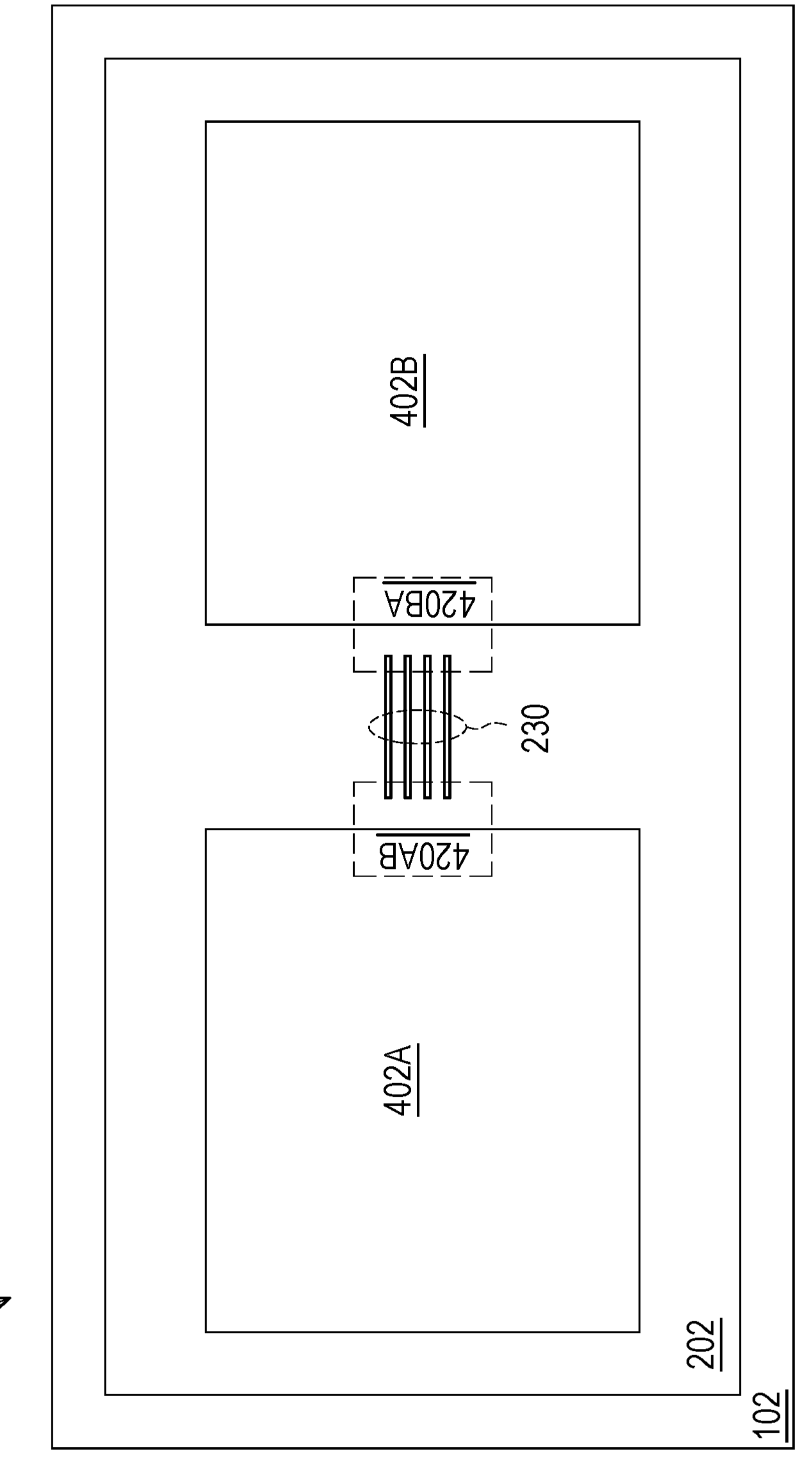
FIGS. 4, 5, and 6 illustrate partial, simplified top views of a semiconductor structure or system with an optical interposer according to embodiments of the present disclosure.

FIG. 4 illustrates a top view of the semiconductor structure 100 according to an embodiment. As shown in FIG. 4, the semiconductor structure 100 includes two dies 402A and 402B on the substrate 202 which is in turn on the substrate 102. Each of the dies 402A and 402B may be a logic die, an FPGA, a memory stack, or other types of dies. The dies 402A and 402B are interconnected through optical paths within the optical interposer 300 (not labeled in FIG. 4) disposed between the dies and the substrate 202. The dashed box 420AB indicates optical structures in the optical interposer 300 (such as optical structures 314, 316, 318 discussed above) that are electrically coupled with the die 402A. The dashed box 420BA indicates optical structures in the optical interposer 300 (such as optical structures 314, 316, 318 discussed above) that are electrically coupled with the die 402B. The dashed boxes 420AB and 420BA are optically coupled to each other by optical structures 230 in the optical interposer 300, such as optical structures 212, 214, 216 in the dielectric layer 210 discussed above. The optical paths between the dashed boxes 420AB and 420BA are bidirectional in an embodiment. The optical paths include multiple optical structures 230 in parallel between the dashed boxes 420AB and 420BA. In an embodiment, these optical structures 230 are silicon nitride-based optical devices. The optical structures 230 may be implemented at the same vertical level or different vertical levels in the optical interposer 300.

Figure 5:
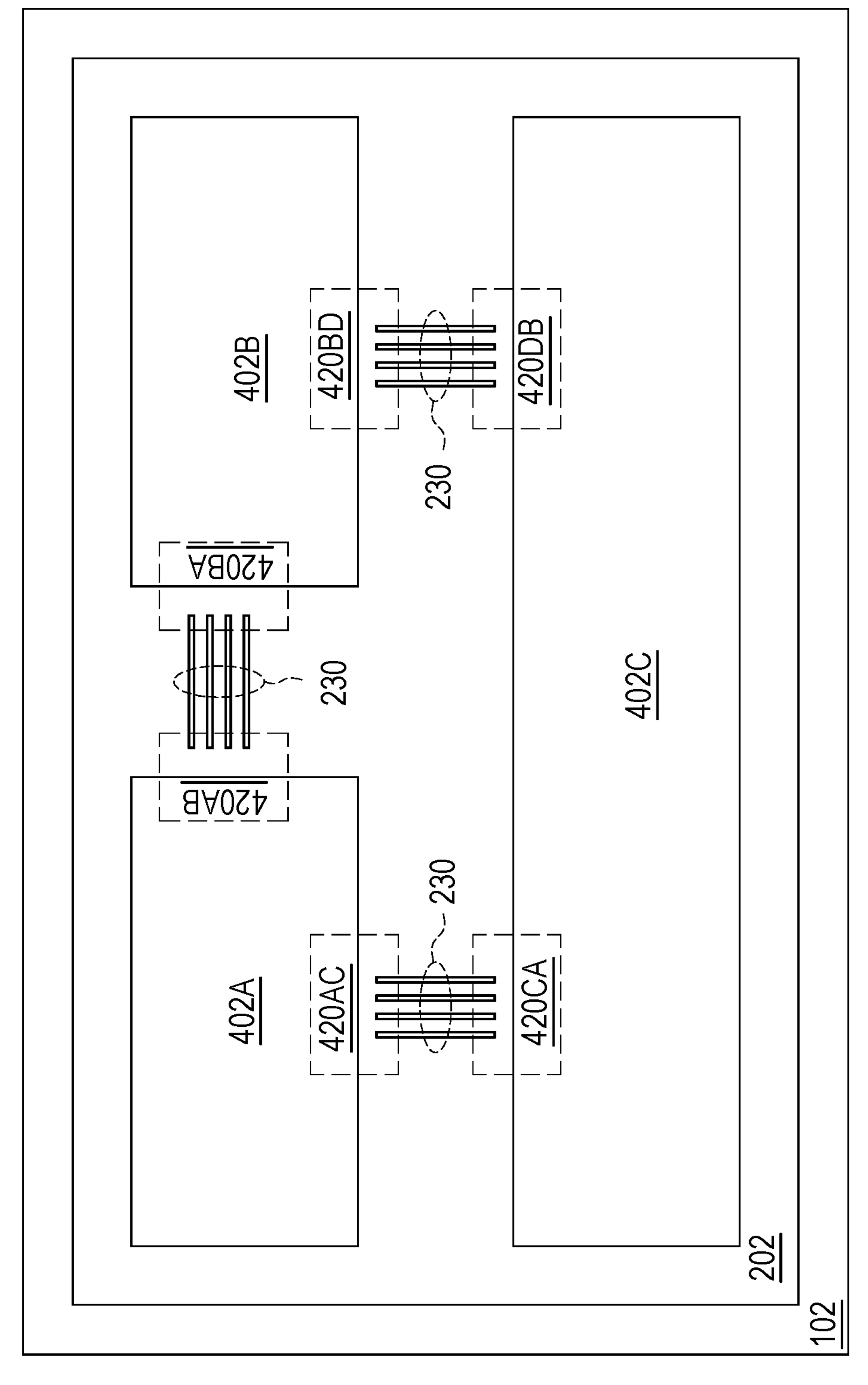

FIG. 5 illustrates a top view of the semiconductor structure 100 according to another embodiment. As shown in FIG. 5, the semiconductor structure 100 includes three dies 402A, 402B, and 402C on the substrate 202 which is in turn on the substrate 102. Each of the dies 402A, 402B, and 402C may be a logic die, an FPGA, a memory stack, or other types of dies. The dies 402A, 402B, and 402C are interconnected through optical paths within the optical interposer 300 (not labeled in FIG. 5) disposed between the dies and the substrate 202. The dashed boxes 420AB and 420AC indicate optical structures in the optical interposer 300 (such as optical structures 314, 316, 318 discussed above) that are electrically coupled with the die 402A. The dashed boxes 420BA and 420BC indicate optical structures in the optical interposer 300 (such as optical structures 314, 316, 318 discussed above) that are electrically coupled with the die 402B. The dashed boxes 420CA and 420CB indicate optical structures in the optical interposer 300 (such as optical structures 314, 316, 318 discussed above) that are electrically coupled with the die 402C. The dashed boxes 420AB and 420BA are optically coupled to each other by multiple optical structures 230 in parallel in the optical interposer 300 (such as optical structures 212, 214, 216 in the dielectric layer 210 discussed above). The dashed boxes 420AC and 420CA are optically coupled to each other by multiple optical structures 230 in parallel in the optical interposer 300 (such as optical structures 212, 214, 216 in the dielectric layer 210 discussed above). The dashed boxes 420BC and 420CB are optically coupled to each other by multiple optical structures 230 in parallel in the optical interposer 300 (such as optical structures 212, 214, 216 in the dielectric layer 210 discussed above). In an embodiment, these optical structures 230 are silicon nitride-based optical devices. The optical structures 230 may be implemented at the same vertical level or different vertical levels in the optical interposer 300. In an embodiment, the optical paths between the dashed boxes 420AB and 420BA are bidirectional, the optical paths between the dashed boxes 420BC and 420CB are bidirectional, and the optical paths between the dashed boxes 420AC and 420CA are bidirectional.

Figure 6:
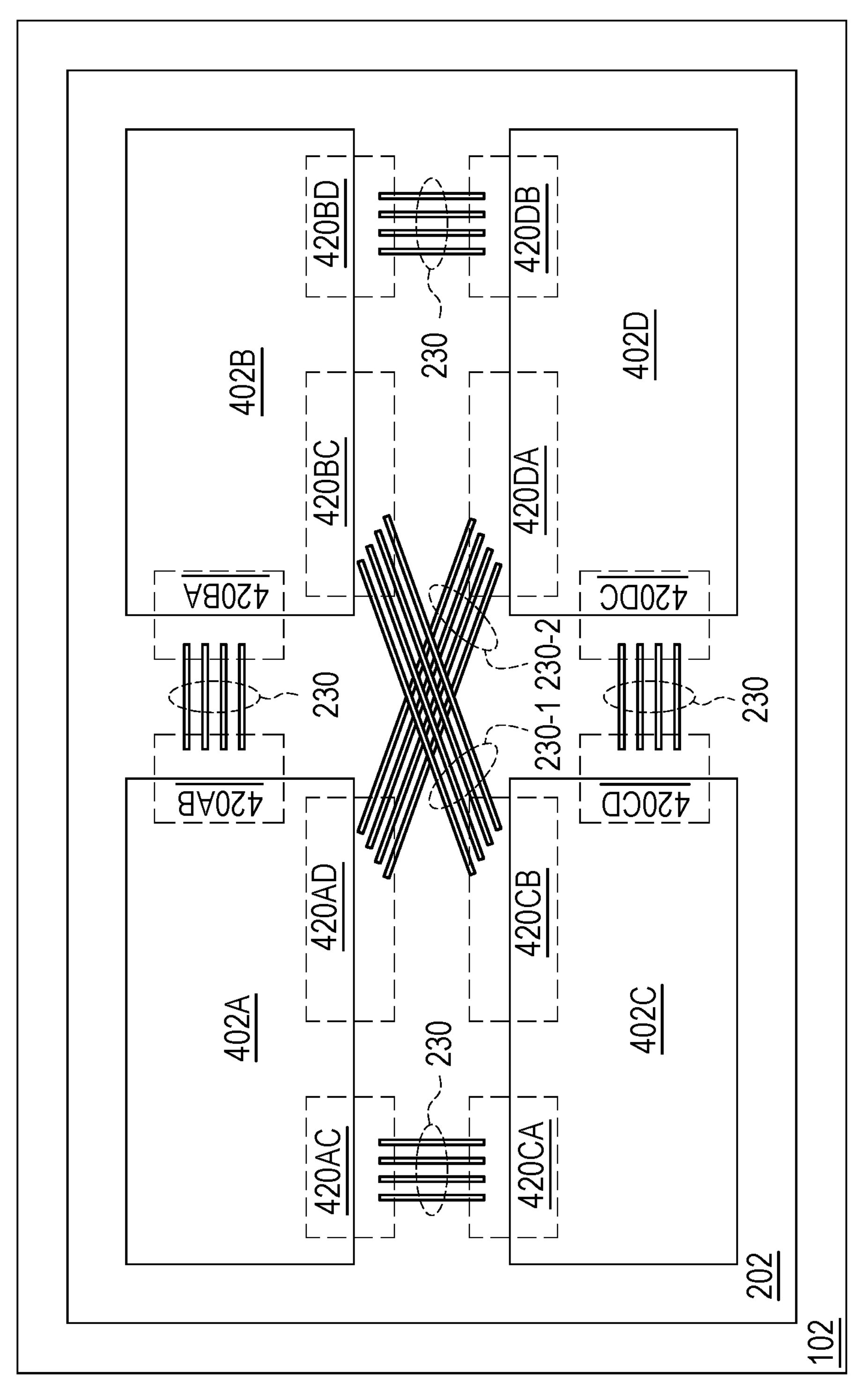

FIG. 6 illustrates a top view of the semiconductor structure 100 according to another embodiment. As shown in FIG. 6, the semiconductor structure 100 includes four dies 402A, 402B, 402C, and 402D on the substrate 202 which is in turn on the substrate 102. Each of the dies 402A, 402B, 402C, and 402D may be a logic die, an FPGA, a memory stack, or other types of dies. The dies 402A, 402B, 402C, and 402D are interconnected through optical paths within the optical interposer 300 (not labeled in FIG. 6) disposed between the dies and the substrate 202. The dashed boxes 420AB, 420AC, and 420AD indicate optical structures in the optical interposer 300 (such as optical structures 314, 316, 318 discussed above) that are electrically coupled with the die 402A. The dashed boxes 420BA, 420BC, and 420BD indicate optical structures in the optical interposer 300 (such as optical structures 314, 316, 318 discussed above) that are electrically coupled with the die 402B. The dashed boxes 420CA, 420CB, and 420CD indicate optical structures in the optical interposer 300 (such as optical structures 314, 316, 318 discussed above) that are electrically coupled with the die 402C. The dashed boxes 420DA, 420DB, and 420DC indicate optical structures in the optical interposer 300 (such as optical structures 314, 316, 318 discussed above) that are electrically coupled with the die 402D. The dashed boxes 420AB and 420BA are optically coupled to each other by multiple optical structures 230 in parallel in the optical interposer 300 (such as optical structures 212, 214, 216 in the dielectric layer 210 discussed above). The dashed boxes 420AC and 420CA are optically coupled to each other by multiple optical structures 230 in parallel in the optical interposer 300 (such as optical structures 212, 214, 216 in the dielectric layer 210 discussed above). The dashed boxes 420AD and 420DA are optically coupled to each other by multiple optical structures 230-2 in parallel in the optical interposer 300 (such as optical structures 212, 214, 216 in the dielectric layer 210 discussed above). The dashed boxes 420BC and 420CB are optically coupled to each other by multiple optical structures 230-1 in parallel in the optical interposer 300 (such as optical structures 212, 214, 216 in the dielectric layer 210 discussed above). The dashed boxes 420BD and 420DB are optically coupled to each other by multiple optical structures 230 in parallel in the optical interposer 300 (such as optical structures 212, 214, 216 in the dielectric layer 210 discussed above). The dashed boxes 420CD and 420DC are optically coupled to each other by multiple optical structures 230 in parallel in the optical interposer 300 (such as optical structures 212, 214, 216 in the dielectric layer 210 discussed above). In an embodiment, these optical structures 230, 230-1, and 230-2 are silicon nitride-based optical devices. In an embodiment, the optical structures 230-1 and the optical structures 230-2 are implemented at different vertical levels in the optical interposer 300. The optical structures 230 may be implemented at the same vertical level or different vertical levels in the optical interposer 300. The optical structures 230 and 230-1 may be implemented at the same vertical level or different vertical levels in the optical interposer 300. The optical structures 230 and 230-2 may be implemented at the same vertical level or different vertical levels in the optical interposer 300. In an embodiment, the optical paths between the dashed boxes 420AB and 420BA are bidirectional, the optical paths between the dashed boxes 420AC and 420CA are bidirectional, the optical paths between the dashed boxes 420AD and 420DA are bidirectional, the optical paths between the dashed boxes 420BC and 420CB are bidirectional, the optical paths between the dashed boxes 420BD and 420DB are bidirectional, and the optical paths between the dashed boxes 420CD and 420DC are bidirectional.

Figure 7:
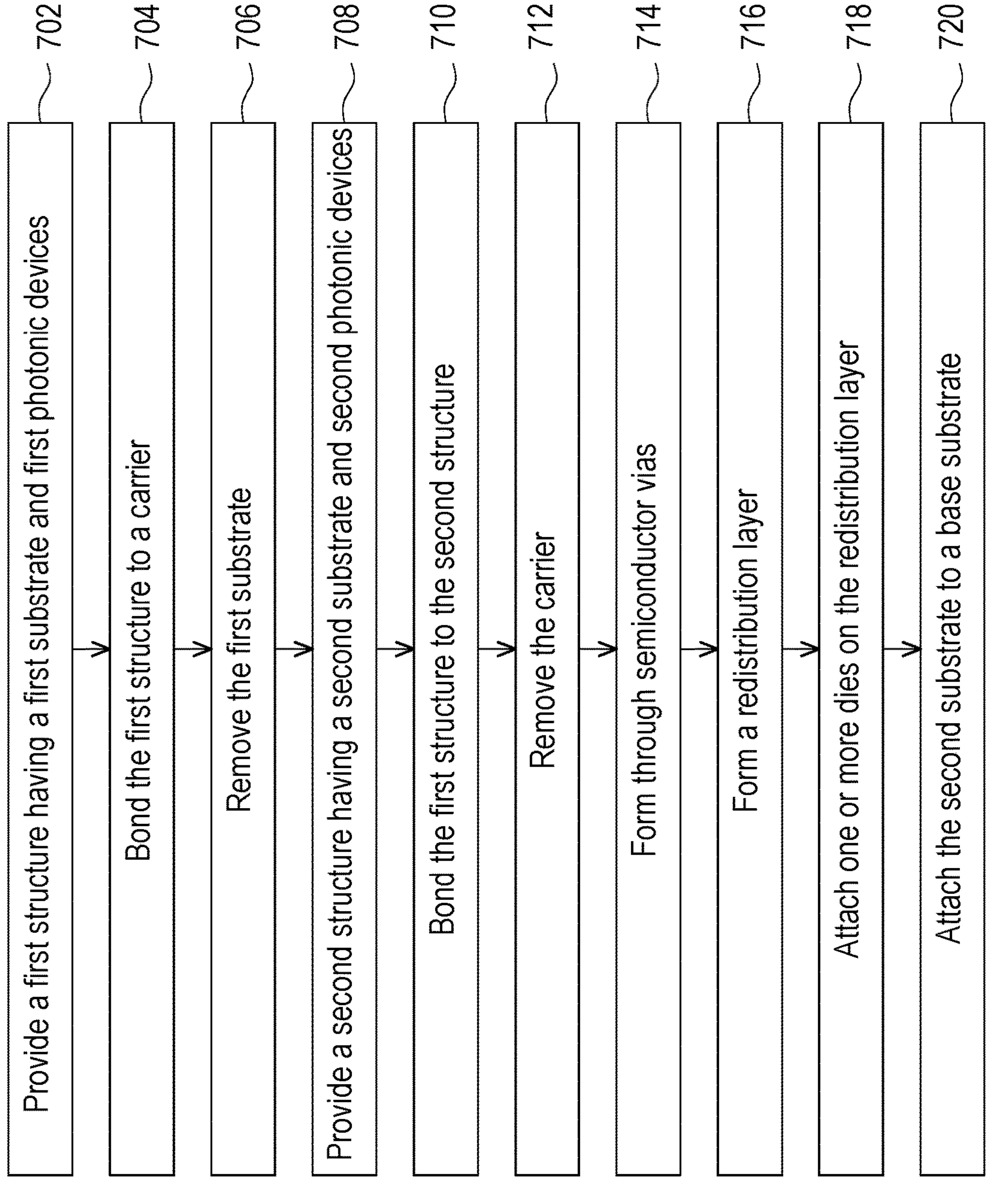
FIG. 7 illustrates a flow chart of a method of making a semiconductor structure or system with an optical interposer, according to embodiments of the present disclosure.

FIG. 7 illustrates a flow chart of a method 700 for manufacturing the semiconductor structure 100, according to various embodiments. The method 700 includes operations 702, 704, 706, 708, 710, 712, 714, 716, 718, and 720. Additional operations are contemplated by the present disclosure. Additional operations can be provided before, during, and after method 700, and some of the operations described can be moved, replaced, or eliminated for additional embodiments of method 700. Method 700 is described below in conjunction with FIGS. 8-17 which illustrate cross-sectional views of the semiconductor structure 100 and other structures during various fabrication stages according to embodiments of the method 700.

Figure 8:
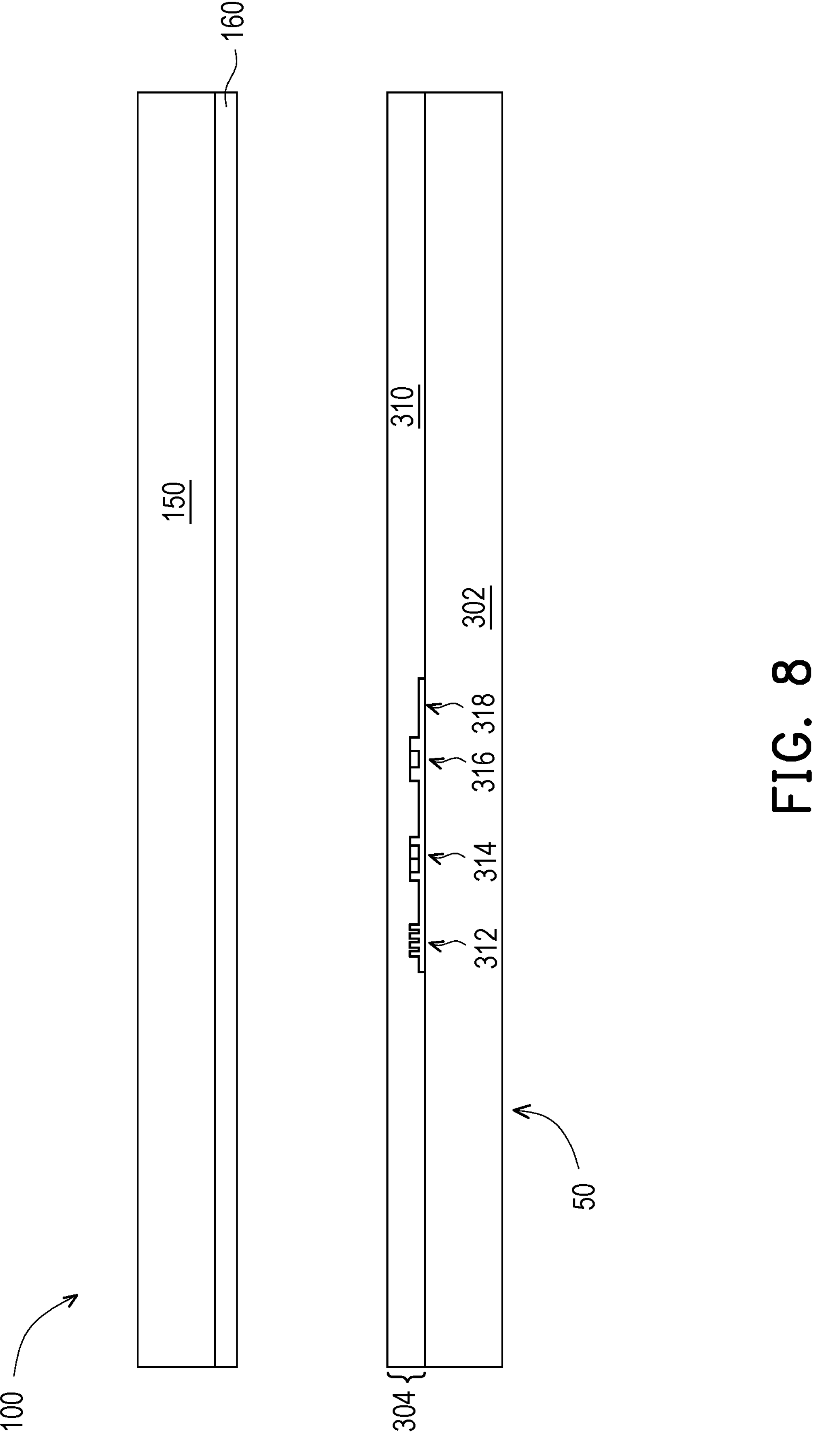
FIGS. 8, 9, 10, 11, 12, 13, 14, 15, 16, and 17 illustrate partial, simplified cross-sectional diagrams of a semiconductor structure or system during various stages of manufacturing according to the method of FIG. 7, according to embodiments of the present disclosure.

At operation 702, the method 700 (FIG. 7) provides or is provided with a first structure 50 having a substrate 302 and a structure 304 on the substrate 302, such as shown in FIG. 8. The structure 304 includes a dielectric layer 310 and multiple optical structures in the dielectric layer 310. For example, the multiple optical structures may include grating coupler(s) 312, modulator(s) 314, photo detector(s) 316, and waveguide(s) 318 discussed above. In an embodiment, the multiple optical structures (e.g., grating coupler(s) 312, modulator(s) 314, photo detector(s) 316, and waveguide(s) 318) are fabricated from a silicon-on-insulator (SOI) substrate. For example, the SOI substrate includes a silicon layer (or another semiconductor layer), the portion of the dielectric layer 310 between the multiple optical structures and the substrate 302, and the substrate 302, wherein the silicon layer (or the other semiconductor layer) provides the semiconductor material in the multiple optical structures. In an embodiment, the substrate 302 is a silicon substrate, such as a silicon wafer. In an embodiment, the dielectric layer 310 include silicon dioxide. The dielectric layer 310 may include dielectric sub-layers. The method 700 also provides or is provided with a carrier 150 with a temporary bonding material 160. For example, the carrier 150 may be a glass substrate and the temporary bonding material 160 may be a polyimide-based temporary adhesive or other types of adhesives.

Figure 9:
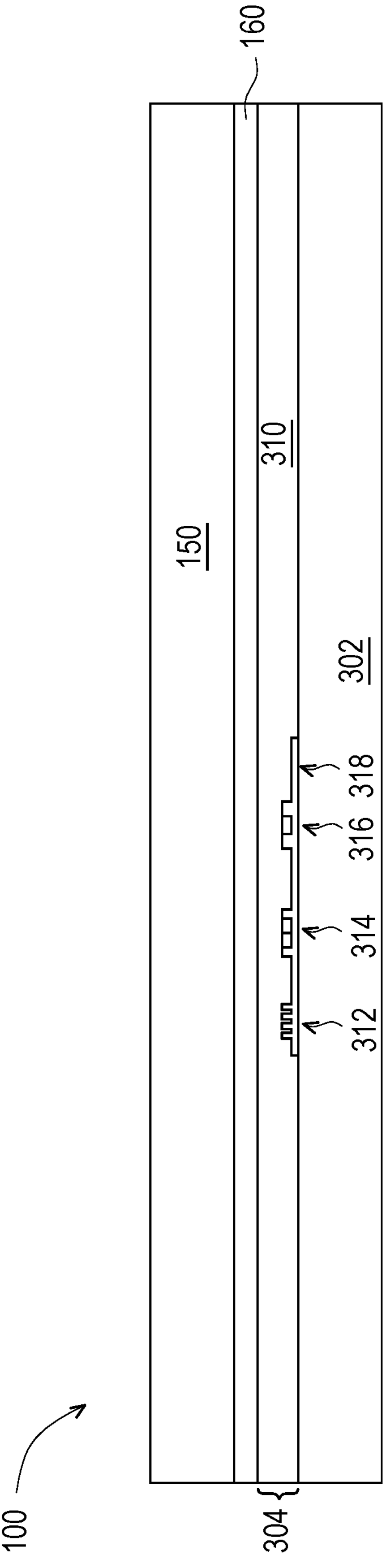

At operation 704, the method 700 (FIG. 7) bonds the first structure 50 and the carrier 150 together by using the temporary bonding material 160, such as shown in FIG. 9. Specifically, the structure 304 is attached to the temporary bonding material 160 and becomes sandwiched between the substrate 302 and the carrier 150.

Figure 10:
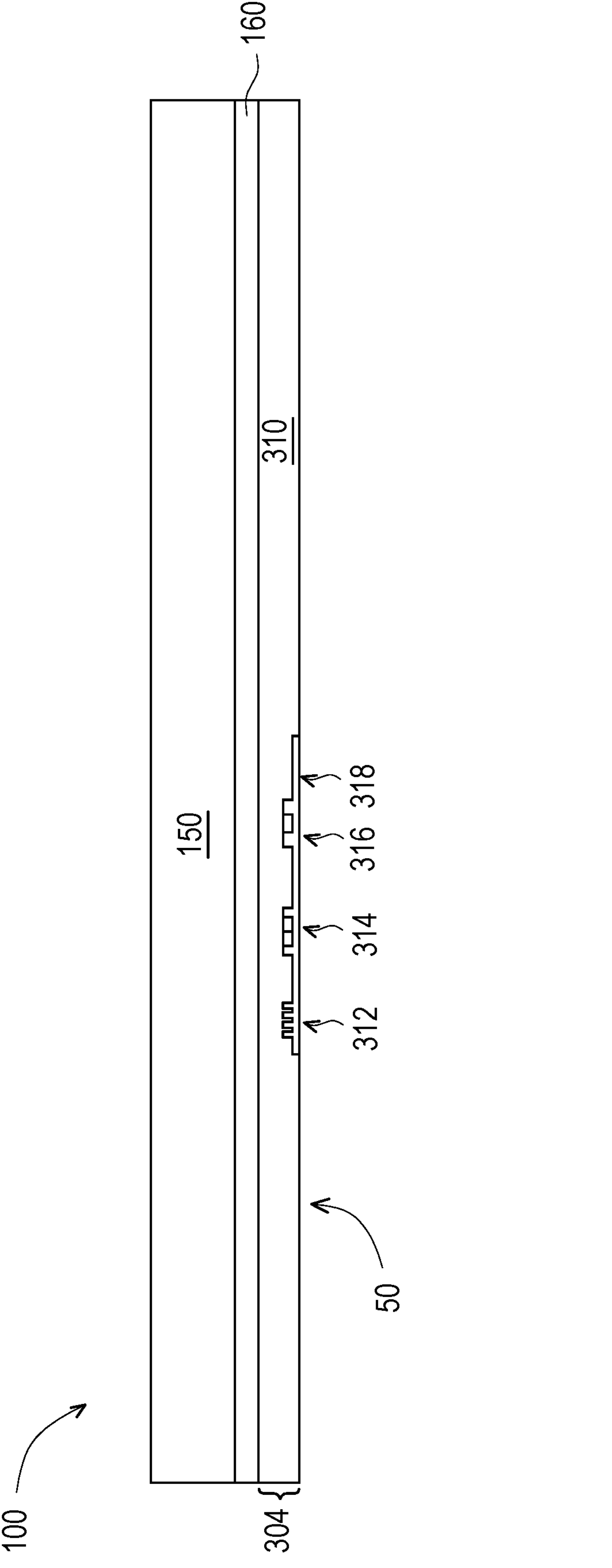

At operation 706, the method 700 (FIG. 7) removes the substrate 302, for example, by grinding and/or polishing the substrate 302. The structure 304 is still bonded to the carrier 150 through the temporary bonding material 160, such as shown in FIG. 10. As a result, a surface of the structure 304 (which is a surface of the dielectric layer 310) is exposed.

Figure 11:
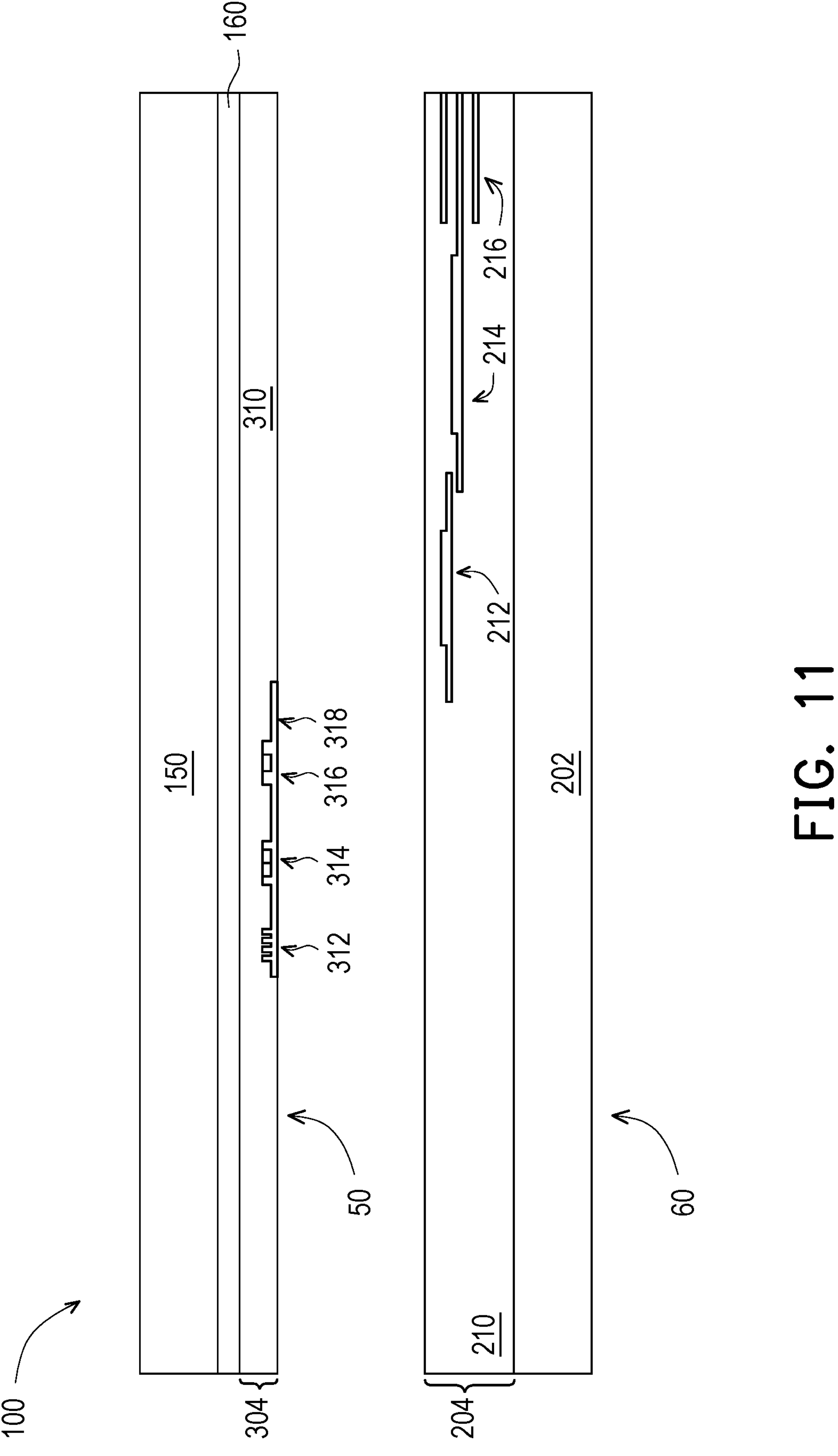

At operation 708, the method 700 (FIG. 7) provides or is provided with a second structure 60 having a substrate 202 and a structure 204 on the substrate 202, such as shown in FIG. 11. The structure 204 includes a dielectric layer 210 and multiple optical structures in the dielectric layer 210. For example, the multiple optical structures may include optical structures (e.g., waveguides) 212, 214 and optical structures (e.g., edge coupler(s)) 216 discussed above. In an embodiment, the substrate 202 is a silicon substrate (e.g., a silicon wafer or a part thereof). Additionally, or alternatively, the substrate 202 may include other semiconductor materials, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. Other substrates, such as multi-layered or gradient substrates, may also be used as the substrate 202. In some embodiments, the substrate 202 may include a glass substrate or a ceramic substrate. In an embodiment, the dielectric layer 210 include silicon dioxide. The dielectric layer 210 may include dielectric sub-layers. A surface of the dielectric layer 210 is exposed.

Figure 12:
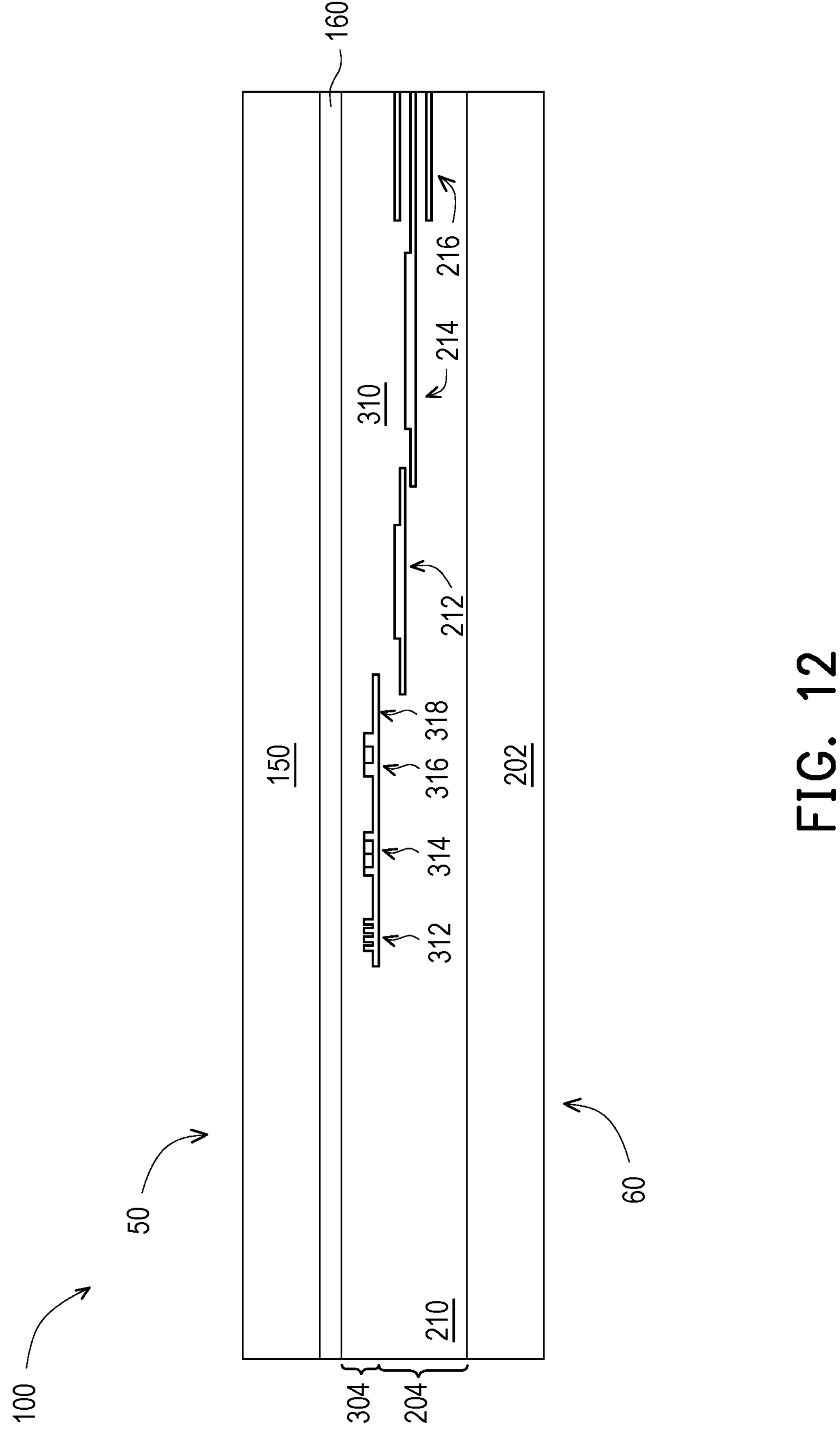

At operation 710, the method 700 (FIG. 7) bonds the first structure 50 and the second structure 60 together, such as shown in FIG. 12. In an embodiment, the exposed surfaces of the dielectric layers 210 and 310 include silicon dioxide and the bonding of the first structure 50 and the second structure 60 are accomplished using oxide-oxide direct bonding (i.e., by bonding the exposed surfaces of the dielectric layers 210 and 310). As a result, the interface between the dielectric layer 210 and the dielectric layer 310 is hardly observable. Further, the bonding strength of oxide-oxide bonds are strong enough to endure any back side processes, such as grinding and chemical mechanical planarization (CMP).

Figure 13:
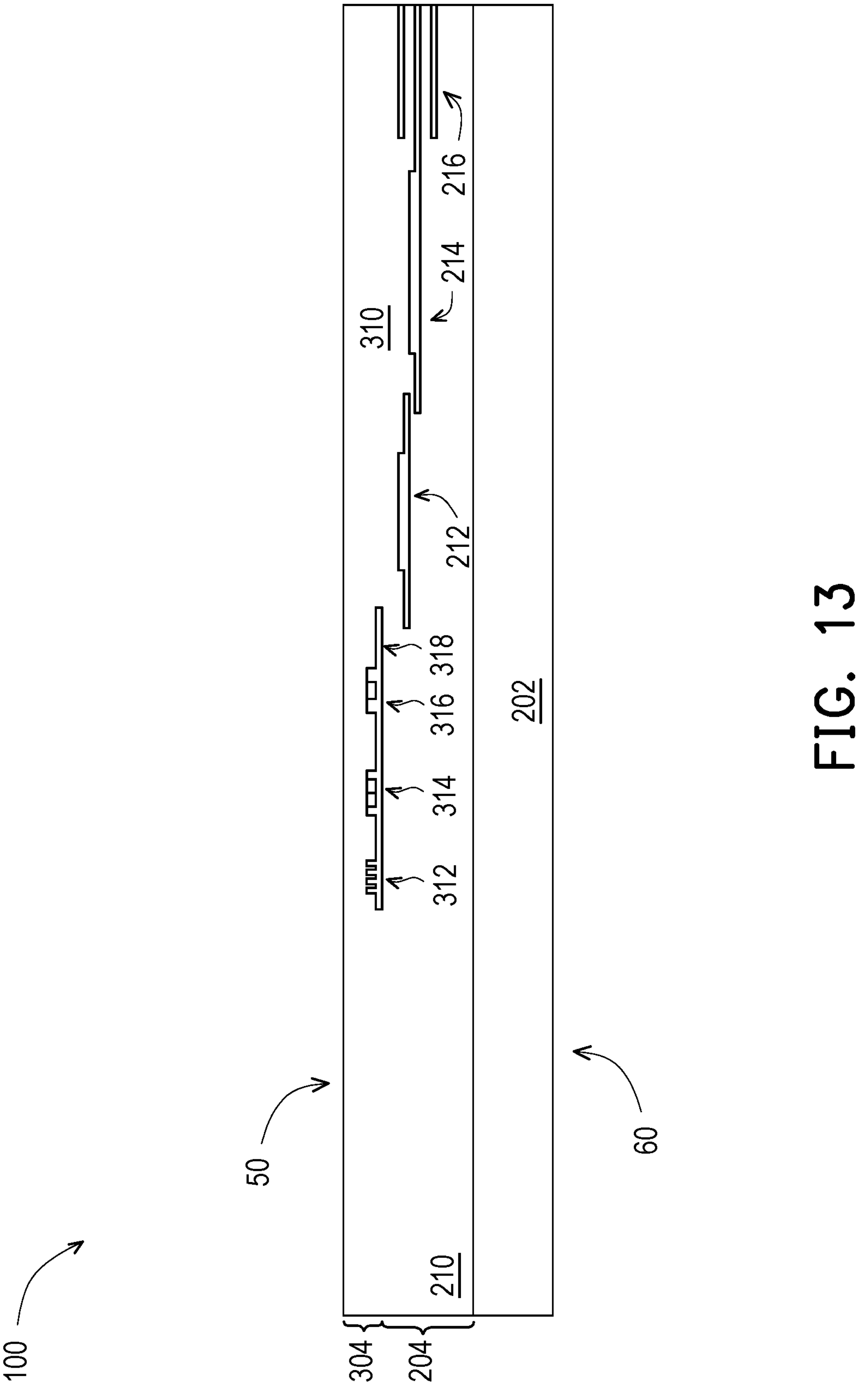

At operation 712, the method 700 (FIG. 7) de-bonds the carrier 150, for example, by using a thermal process or an ultraviolet (UV) process to break down the temporary bonding material 160. This leaves the dielectric layers 210 and 310 on the substrate 202, such as shown in FIG. 13. As a result, another surface of the structure 304 (which is a surface of the dielectric layer 310) is exposed.

Figure 14:
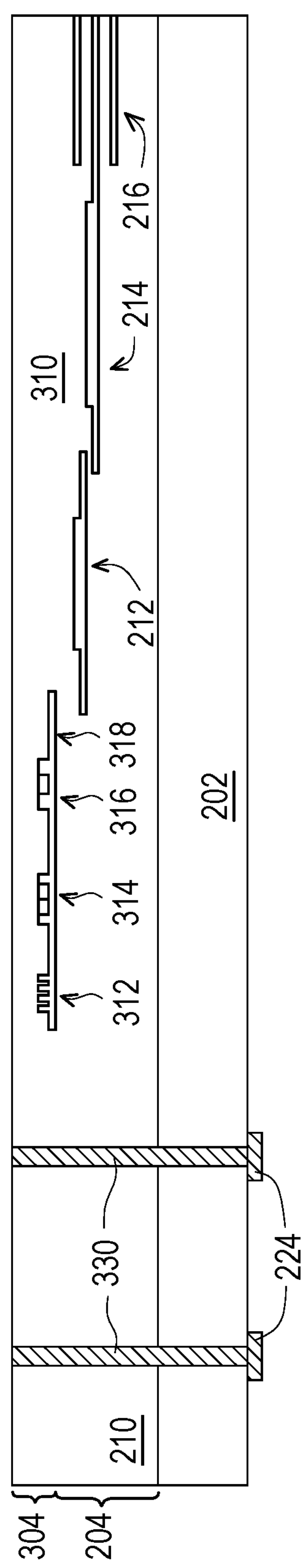
Figure 14:

At operation 714, the method 700 (FIG. 7) forms through vias 330 that penetrate through the dielectric layers 310 and 210 and the substrate 202, such as shown in FIG. 14. This may involve a variety of processes. For example, operation 714 may first form holes that penetrate through the dielectric layers 310 and 210 and the substrate 202, for example, by drilling, etching, and/or other methods. Then, operation 714 may form conductive vias 330 in the holes (for example, on the sidewalls of the holes and/or completely filling the holes). Operation 714 may also form conductive pads 224 on the bottom surface of the substrate 202 and electrically connected to the through vias 330. Operation 714 may further perform a planarization process (such as CMP) to the through vias 330 and the dielectric layer 310.

Figure 15:
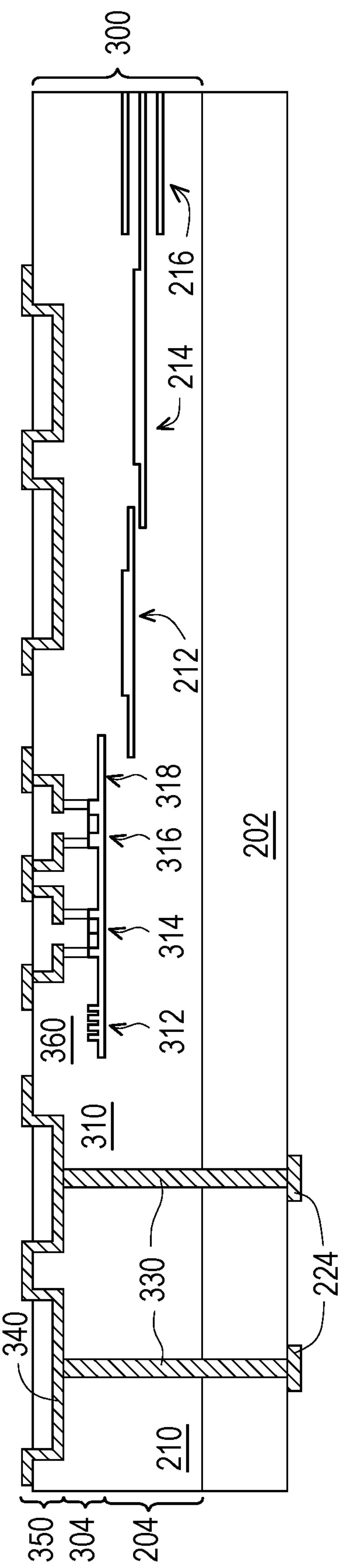

At operation 716, the method 700 (FIG. 7) forms an RDL 350 on the through vias 330 and the dielectric layer 310, such as shown in FIG. 15. The RDL 350 includes one or more dielectric layers 360 and metallization patterns 340, discussed above. Operation 716 may include patterning, etching, deposition, planarization, and/or other suitable processes. As a result, an optical interposer 300 is formed with the RDL 350, the dielectric layers 210 and 310, and the optical structures embedded in the dielectric layers 210 and 310. The conductive materials in the through vias 330 and the metallization patterns 340 may be formed in the same process or in different processes.

Figure 16:
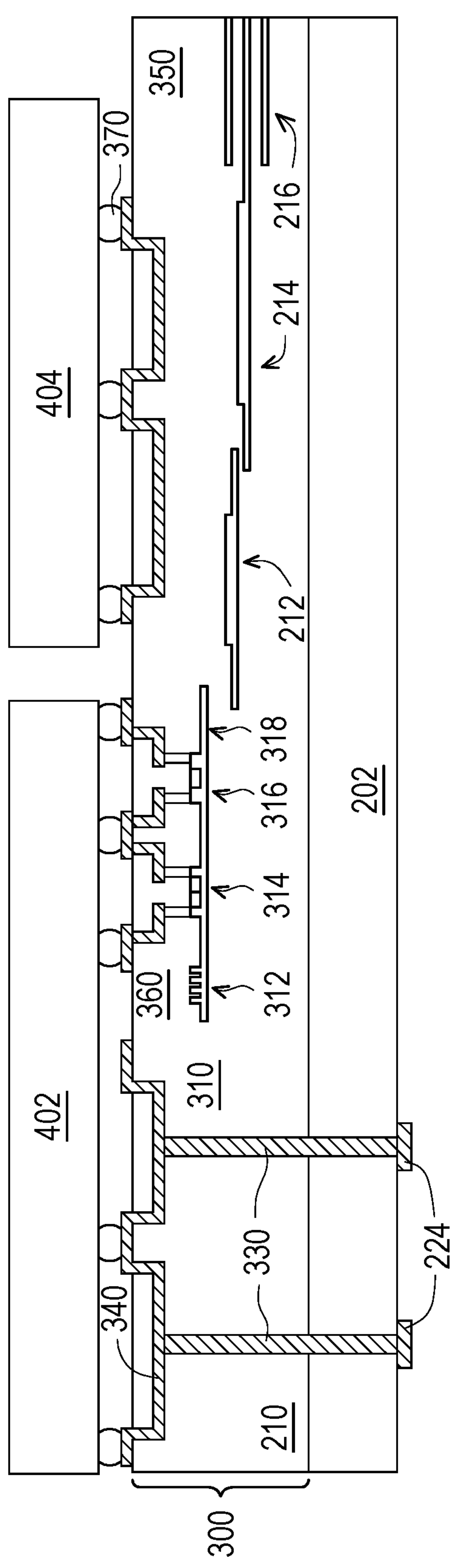

At operation 718, the method 700 (FIG. 7) attaches one or more dies 402 and/or 404 on the RDL 350, such as shown in FIG. 16. The one or more dies 402 and/or 404 may be attached on the RDL 350 using conductive connectors 370, discussed above. This results in an assembly having the substrate 202, the optical interposer 300, the dies 402 and/or 404, and through vias 330.

Figure 17:
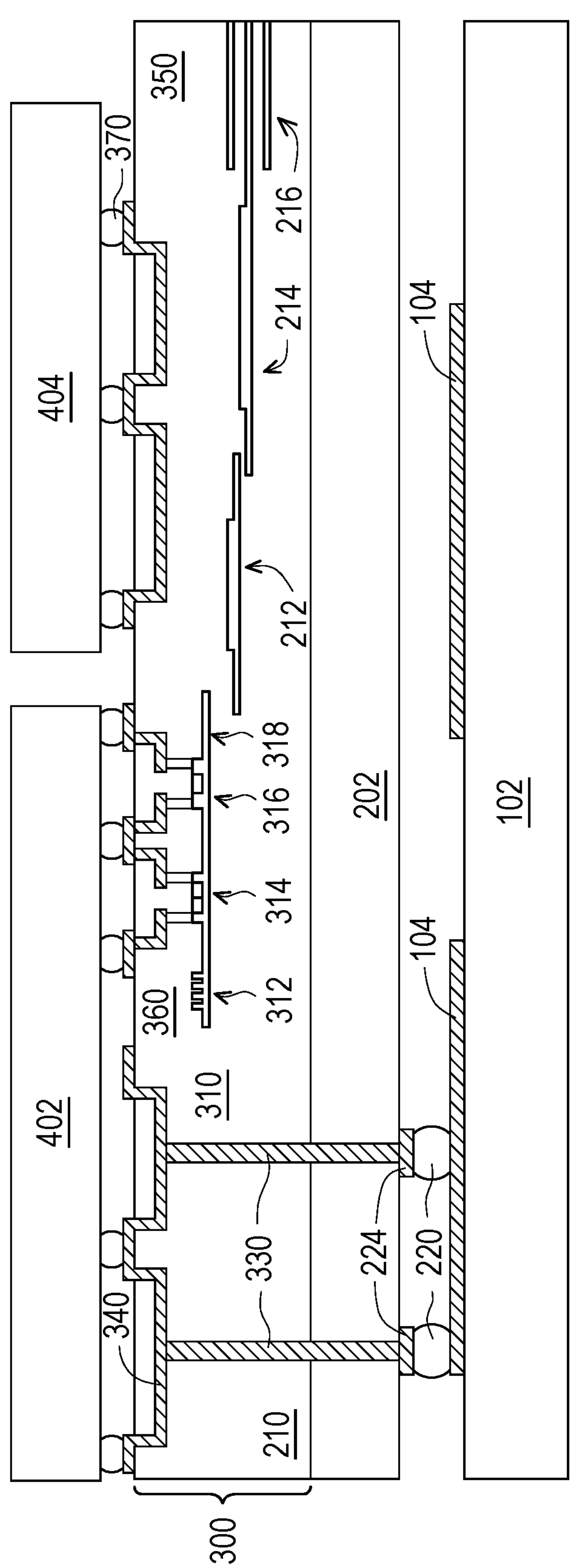

At operation 720, the method 700 (FIG. 7) attaches the assembly resulted from the operation 718 to a substrate 102, such as shown in FIG. 17. The substrate 102 may be an organic substrate as discussed above and may include metallization patterns 104. The assembly may be attached to the substrate 102 using conductive connectors 220 as discussed above.

Figure 18:
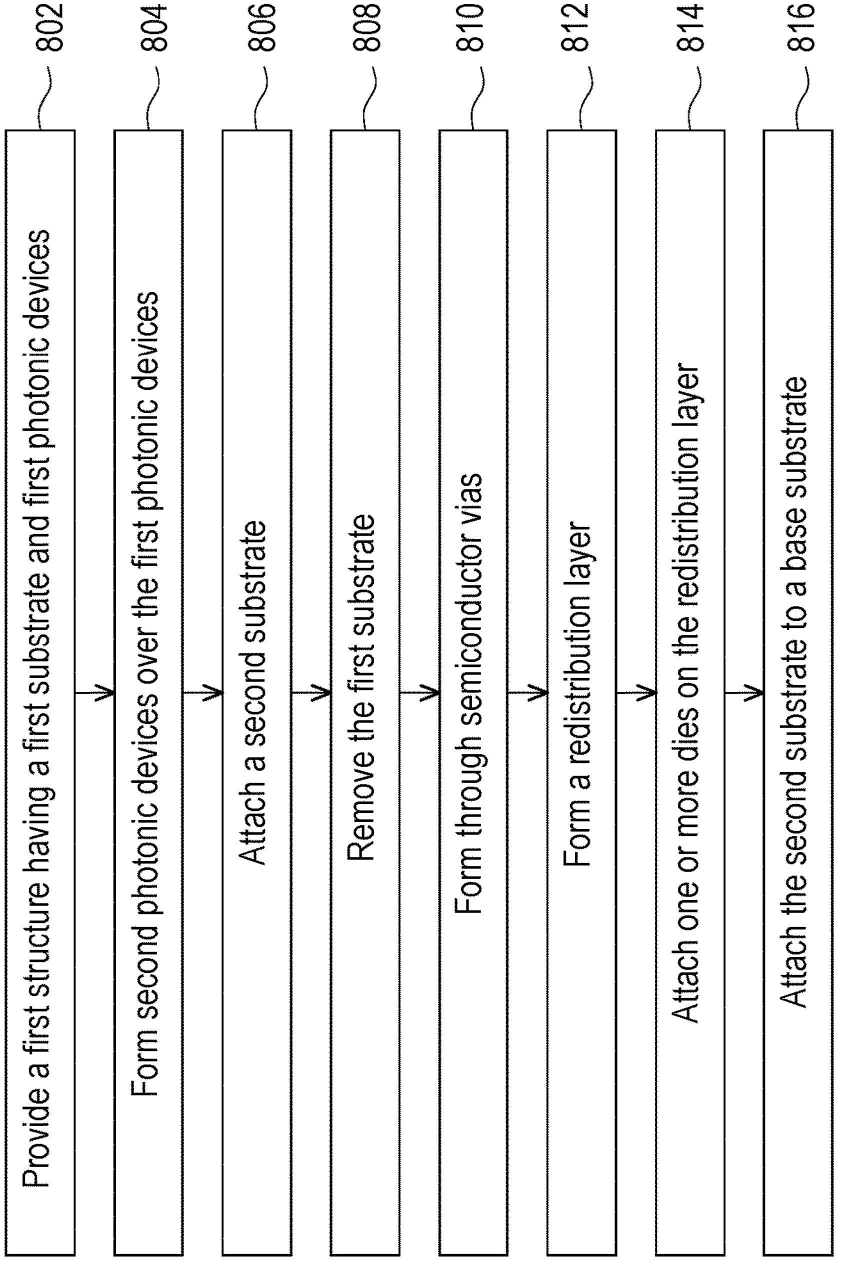
FIG. 18 illustrates a flow chart of a method of making a semiconductor structure or system with an optical interposer, according to another embodiment of the present disclosure.

FIG. 18 illustrates a flow chart of a method 800 for manufacturing the semiconductor structure 100, according to another embodiment. The method 800 includes operations 802, 804, 806, 808, 810, 812, 814, and 816. Additional operations are contemplated by the present disclosure. Additional operations can be provided before, during, and after method 800, and some of the operations described can be moved, replaced, or eliminated for additional embodiments of method 800. Method 800 is described below in conjunction with FIGS. 19-22 and 14-17 which illustrate cross-sectional views of the semiconductor structure 100 and other structures during various fabrication stages according to embodiments of the method 800.

Figure 19:
FIGS. 19, 20, 21, and 22 illustrate partial, simplified cross-sectional diagrams of a semiconductor structure or system during various stages of manufacturing according to the method of FIG. 18, according to embodiments of the present disclosure.

At operation 802, the method 800 (FIG. 18) provides or is provided with a first structure 50 having a substrate 302 and a structure 304 on the substrate 302, such as shown in FIG. 19. The structure 304 includes a dielectric layer 310 and multiple optical structures in the dielectric layer 310. For example, the multiple optical structures may include grating coupler(s) 312, modulator(s) 314, photo detector(s) 316, and waveguide(s) 318 discussed above. In an embodiment, the multiple optical structures (e.g., grating coupler(s) 312, modulator(s) 314, photo detector(s) 316, and waveguide(s) 318) are fabricated from a silicon-on-insulator (SOI) substrate. For example, the SOI substrate includes a silicon layer (or another semiconductor layer), the portion of the dielectric layer 310 between the multiple optical structures and the substrate 302, and the substrate 302, wherein the silicon layer (or the other semiconductor layer) provides the semiconductor material in the multiple optical structures. In an embodiment, the substrate 302 is a silicon substrate, such as a silicon wafer. In an embodiment, the dielectric layer 310 include silicon dioxide. The dielectric layer 310 may include dielectric sub-layers.

Figure 20:
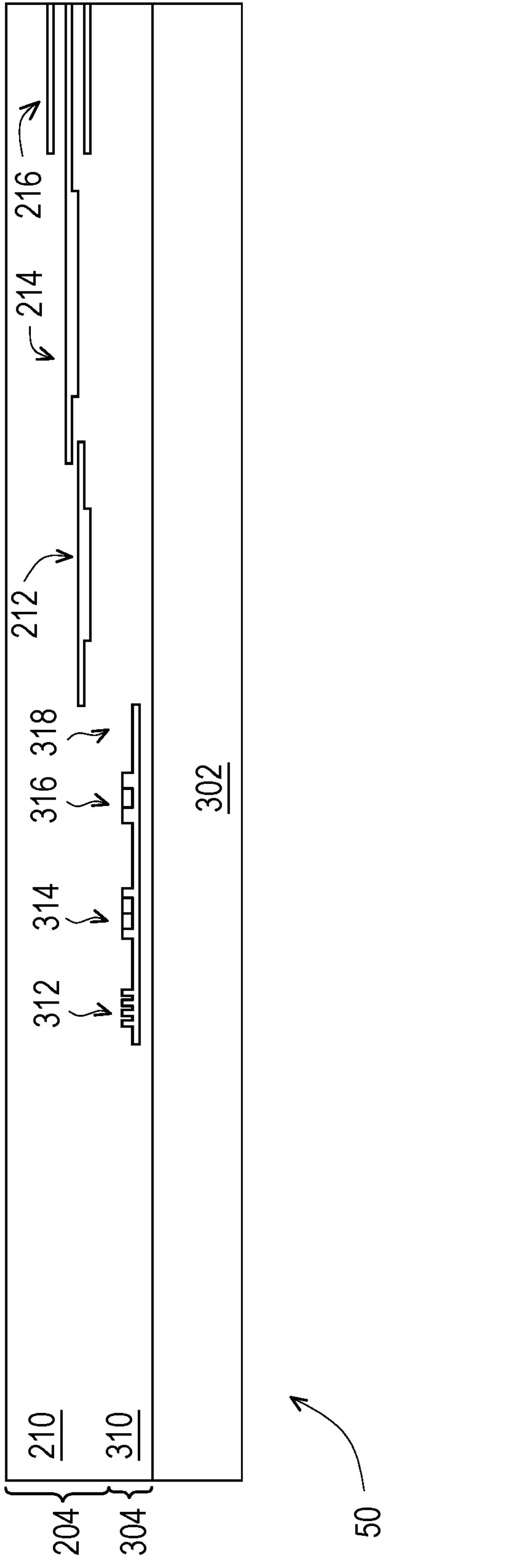
Figure 21:
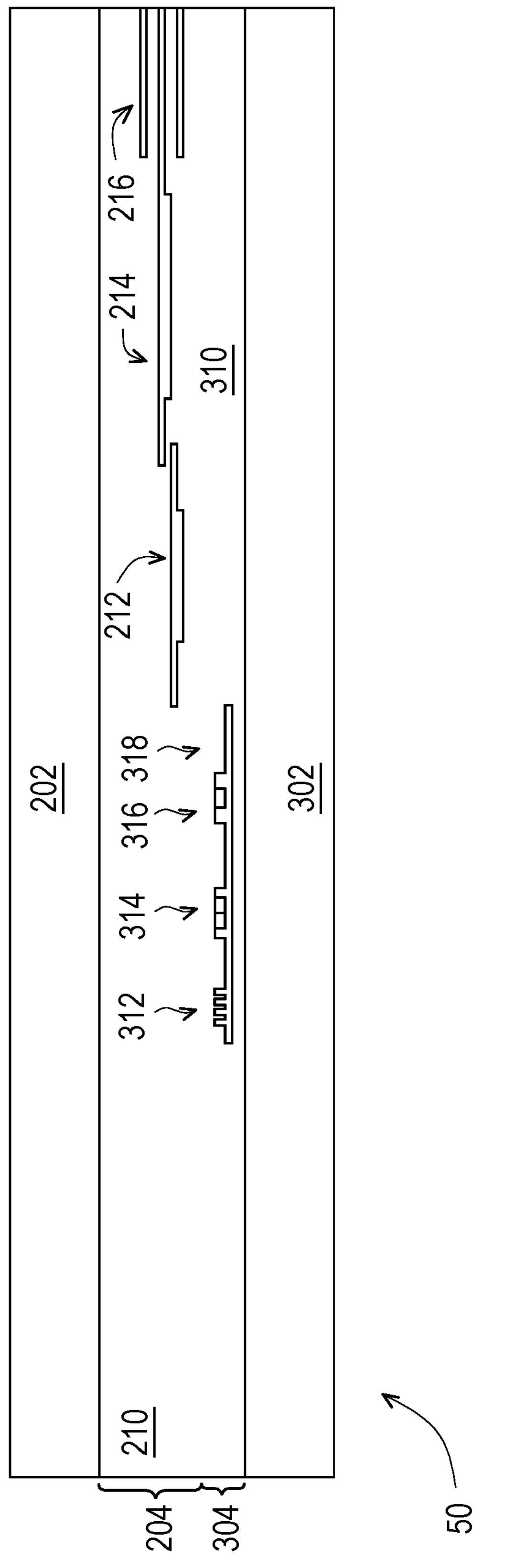

At operation 804, the method 800 (FIG. 18) forms a structure 204 on the structure 304, such as shown in FIG. 20. The structure 204 includes a dielectric layer 210 and multiple optical structures in the dielectric layer 210. For example, the multiple optical structures may include optical structures (e.g., waveguides) 212, 214 and optical structures (e.g., edge coupler(s)) 216 discussed above. In some embodiments, the optical structures in the dielectric layer 210 are formed to overlap with the optical structures in the dielectric layer 310 so as to be optically coupled with each other to form an optical path. In an embodiment, the dielectric layer 210 includes silicon dioxide and the optical structures 212, 214, and 216 include silicon nitride. The dielectric layer 210 may include dielectric sub-layers. In some embodiments, the structure 204 is in direct contact with the structure 304. In an embodiment, the structure 204 is formed by a process that includes depositing materials (such as dielectric materials) on the structure 304 and patterning the materials to form the various optical structures.

At operation 806, the method 800 (FIG. 18) attaches a substrate 202 on the structure 204, such as shown in FIG. 20. In an embodiment, the substrate 202 is a silicon substrate (e.g., a silicon wafer or a part thereof). Additionally, or alternatively, the substrate 202 may include other semiconductor materials, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP; or combinations thereof. Other substrates, such as multi-layered or gradient substrates, may also be used as the substrate 202. In some embodiments, the substrate 202 may include a glass substrate or a ceramic substrate. The substrate 202 may be attached on the structure 204 using adhesive or other suitable materials and/or methods.

Figure 22:
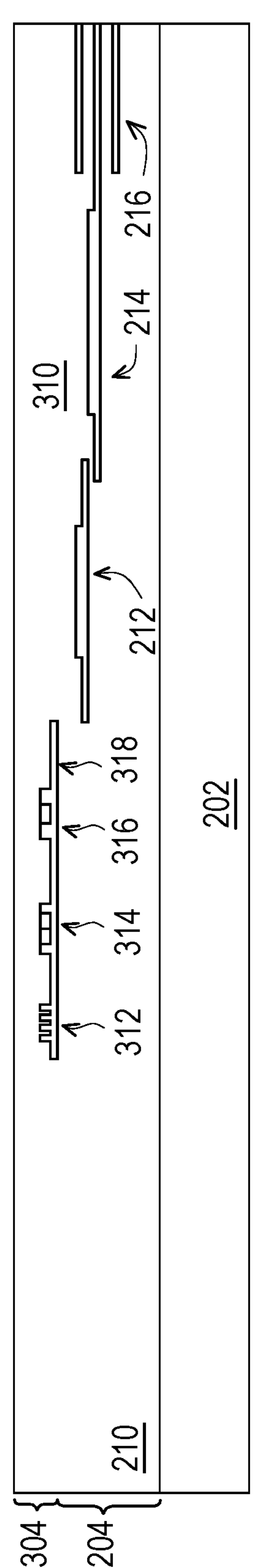

At operation 808, the method 800 (FIG. 18) removes the substrate 302, for example, by grinding and/or polishing the substrate 302. The resultant structure is shown in FIG. 22, which is flipped upside down compared to the structure shown in FIG. 21.

At operation 810, the method 800 (FIG. 18) forms through vias 330 that penetrate through the dielectric layers 310 and 210 and the substrate 202, such as shown in FIG. 14. This is substantially the same as operation 714 discussed above.

At operation 812, the method 800 (FIG. 18) forms an RDL 350 on the through vias 330 and the dielectric layer 310, such as shown in FIG. 15. This is substantially the same as operation 716 discussed above.

At operation 814, the method 800 (FIG. 18) attaches one or more dies 402 and/or 404 on the RDL 350, such as shown in FIG. 16. This is substantially the same as operation 718 discussed above.

At operation 816, the method 800 (FIG. 18) attaches the assembly resulted from the operation 814 to a substrate 102, such as shown in FIG. 17. This is substantially the same as operation 720 discussed above.

Figure 23:
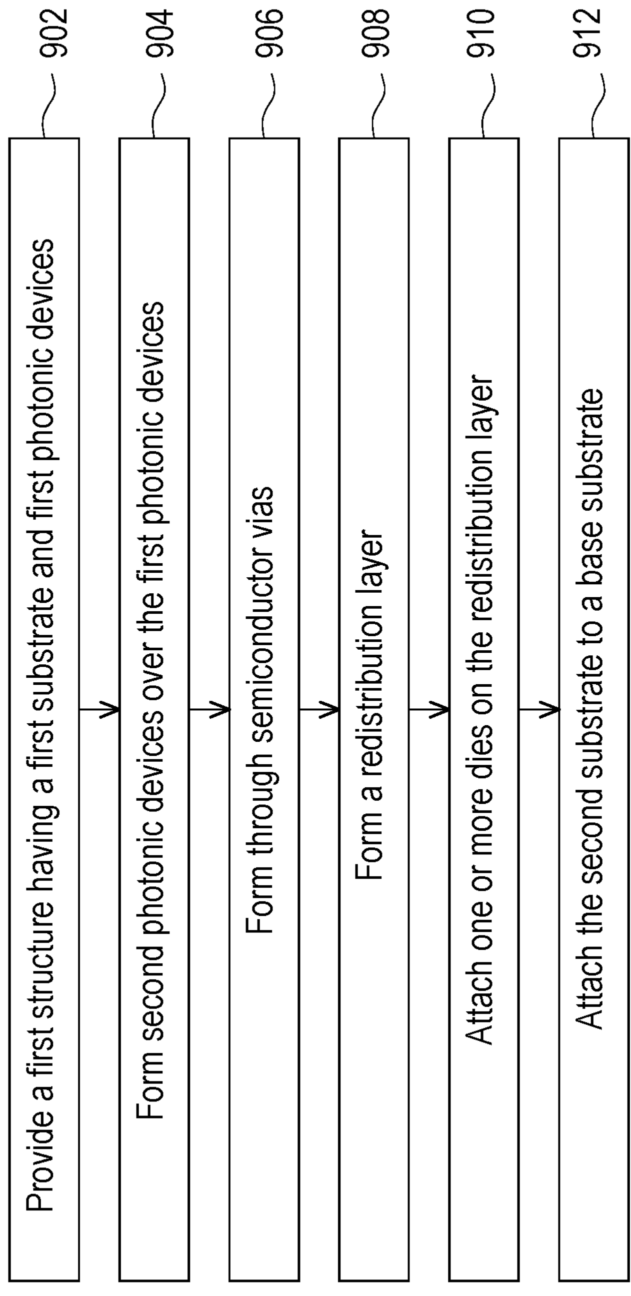
FIG. 23 illustrates a flow chart of a method of making a semiconductor structure or system with an optical interposer, according to another embodiment of the present disclosure.

FIG. 23 illustrates a flow chart of a method 900 for manufacturing the semiconductor structure 100, according to yet another embodiment. The method 900 includes operations 902, 904, 906, 908, 910, 912, 914, and 916. Additional operations are contemplated by the present disclosure. Additional operations can be provided before, during, and after method 900, and some of the operations described can be moved, replaced, or eliminated for additional embodiments of method 900. Method 900 is described below in conjunction with FIGS. 24-29 which illustrate cross-sectional views of the semiconductor structure 100 and other structures during various fabrication stages according to embodiments of the method 900.

Figures 24, 25:
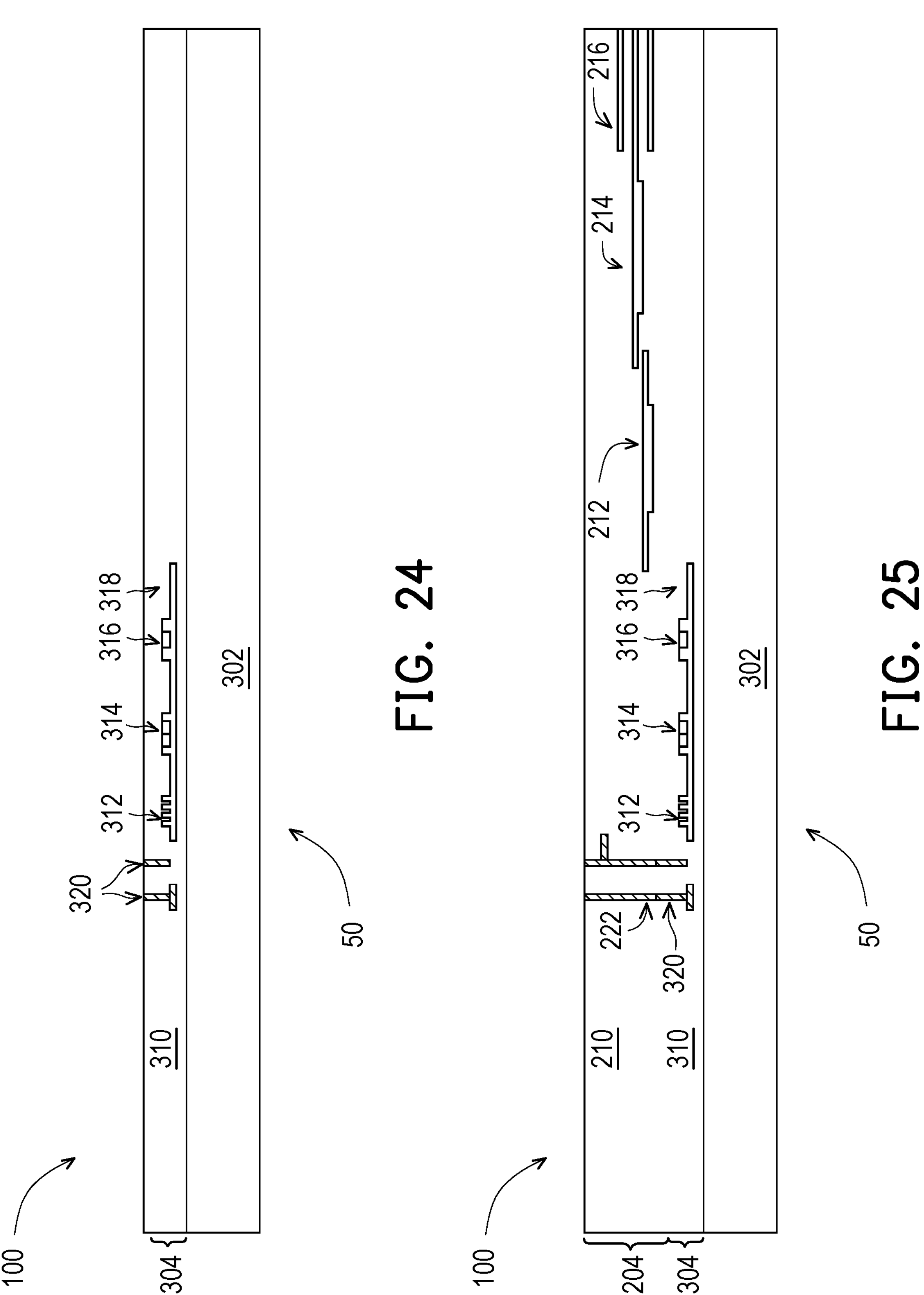
FIGS. 24, 25, 26, 27, 28, and 29 illustrate partial, simplified cross-sectional diagrams of a semiconductor structure or system during various stages of manufacturing according to the method of FIG. 23, according to embodiments of the present disclosure.

At operation 902, the method 900 (FIG. 23) provides or is provided with a first structure 50 having a substrate 302 and a structure 304 on the substrate 302, such as shown in FIG. 24. The structure 304 includes a dielectric layer 310 and multiple optical structures in the dielectric layer 310. For example, the multiple optical structures may include grating coupler(s) 312, modulator(s) 314, photo detector(s) 316, and waveguide(s) 318 discussed above. In an embodiment, the multiple optical structures (e.g., grating coupler(s) 312, modulator(s) 314, photo detector(s) 316, and waveguide(s) 318) are fabricated from a silicon-on-insulator (SOI) substrate. For example, the SOI substrate includes a silicon layer (or another semiconductor layer), the portion of the dielectric layer 310 between the multiple optical structures and the substrate 302, and the substrate 302, wherein the silicon layer (or the other semiconductor layer) provides the semiconductor material in the multiple optical structures. In an embodiment, the substrate 302 is a silicon substrate, such as a silicon wafer. In an embodiment, the dielectric layer 310 include silicon dioxide. The dielectric layer 310 may include dielectric sub-layers. Further, as depicted in FIG. 24, the structure 304 includes connection structures 320 such as metal wires and vias. The connection structures 320 are electrically coupled to the multiple optical structures. In this embodiment, the connection structures 320 are used to electrically connect the multiple optical structures to an RDL 350 fabricated later (see FIG. 27). In another embodiment (not shown), the multiple optical structures (e.g., grating coupler(s) 312, modulator(s) 314, photo detector(s) 316, and waveguide(s) 318) are fabricated on a bulk silicon substrate 302 instead of an SOI substrate. In such embodiment, the dielectric layer portion between the multiple optical structures and the substrate 302, as shown in FIG. 24, is omitted.

At operation 904, the method 900 (FIG. 23) forms a structure 204 on the structure 304, such as shown in FIG. 25. The structure 204 includes a dielectric layer 210 and multiple optical structures in the dielectric layer 210. For example, the multiple optical structures may include optical structures (e.g., waveguides) 212, 214 and optical structures (e.g., edge coupler(s)) 216 discussed above. In some embodiments, the optical structures in the dielectric layer 210 are formed to overlap with the optical structures in the dielectric layer 310 so as to be optically coupled with each other to form an optical path. Further, as depicted in FIG. 25, the structure 204 includes connection structures 222 that are electrically coupled to the connection structures 320. The connection structures 222 may include metal wires and vias that electrically connect the multiple optical structures to an RDL 350 fabricated later (see FIG. 27). In an embodiment, the dielectric layer 210 includes silicon dioxide and the optical structures 212, 214, and 216 include silicon nitride. The dielectric layer 210 may include dielectric sub-layers. In some embodiments, the structure 204 is in direct contact with the structure 304. In an embodiment, the structure 204 is formed by a process that includes depositing materials (such as dielectric materials and conductive materials) on the structure 304 and patterning the materials to form the various elements.

Figure 26:
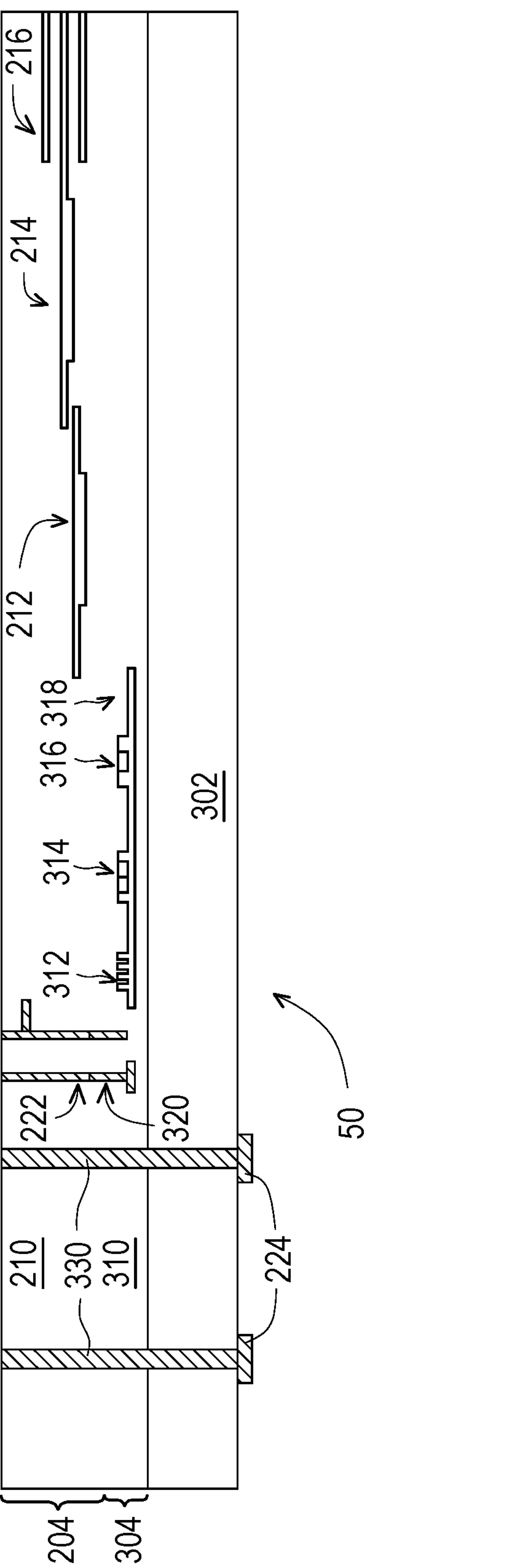

At operation 906, the method 900 (FIG. 23) forms through vias 330 that penetrate through the dielectric layers 310 and 210 and the substrate 302, such as shown in FIG. 26. This is substantially the same as operation 714 discussed above.

Figure 27:
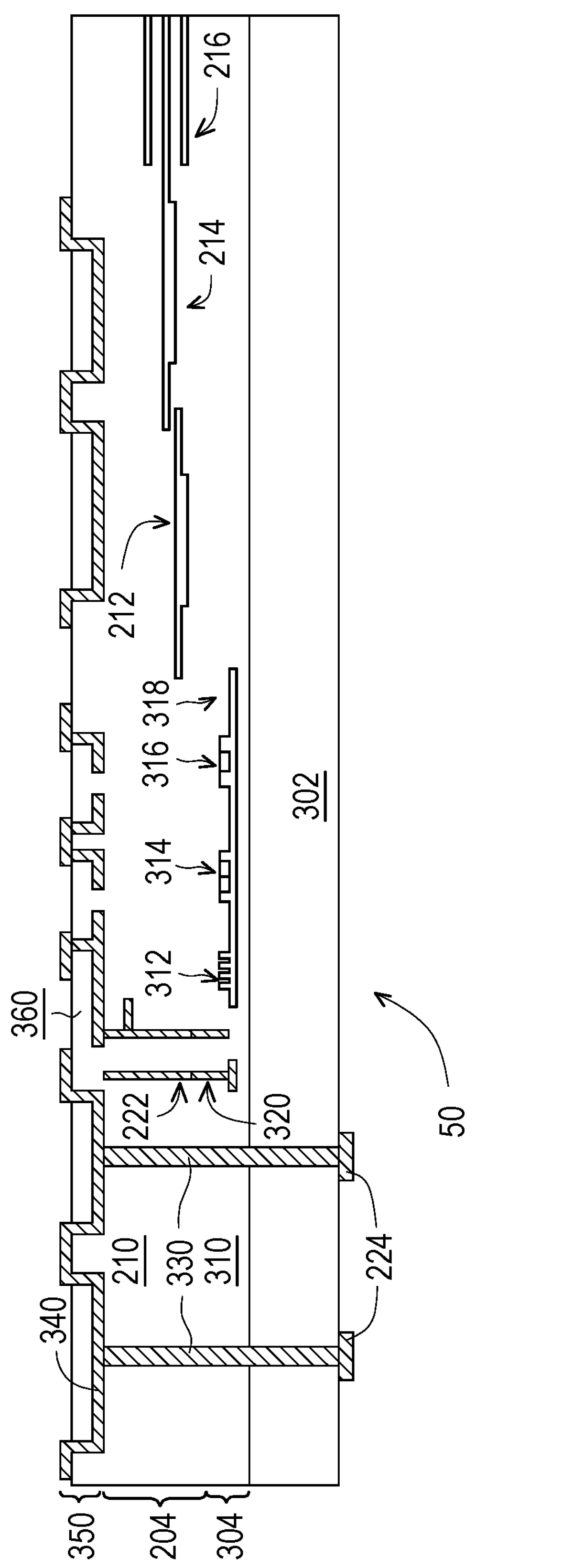

At operation 908, the method 900 (FIG. 23) forms an RDL 350 on the through vias 330 and the dielectric layer 210, such as shown in FIG. 27. This is substantially the same as operation 716 discussed above. In the depicted embodiment, the metallization patterns 340 in the RDL 350 are also electrically connected to the connection structures 222.

Figure 28:
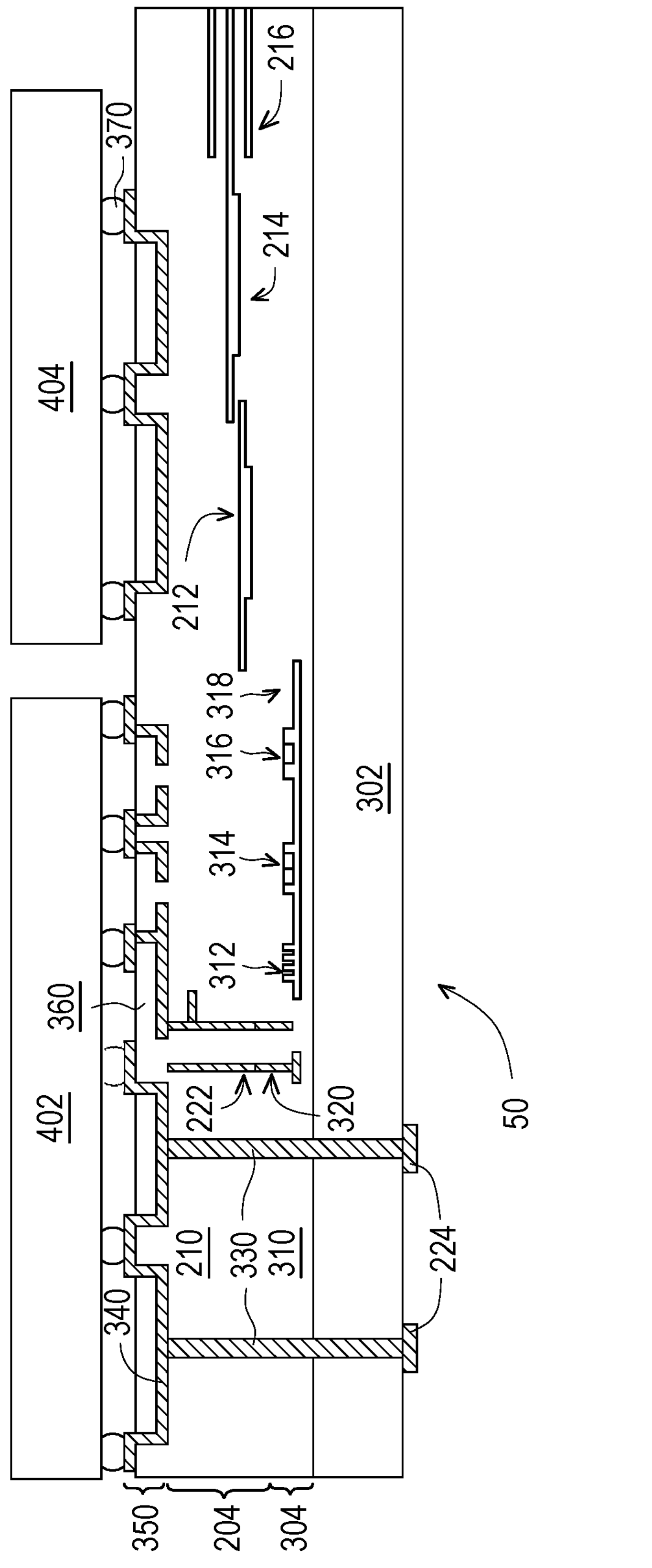

At operation 910, the method 900 (FIG. 23) attaches one or more dies 402 and/or 404 on the RDL 350, such as shown in FIG. 28. This is substantially the same as operation 718 discussed above.

Figure 29:
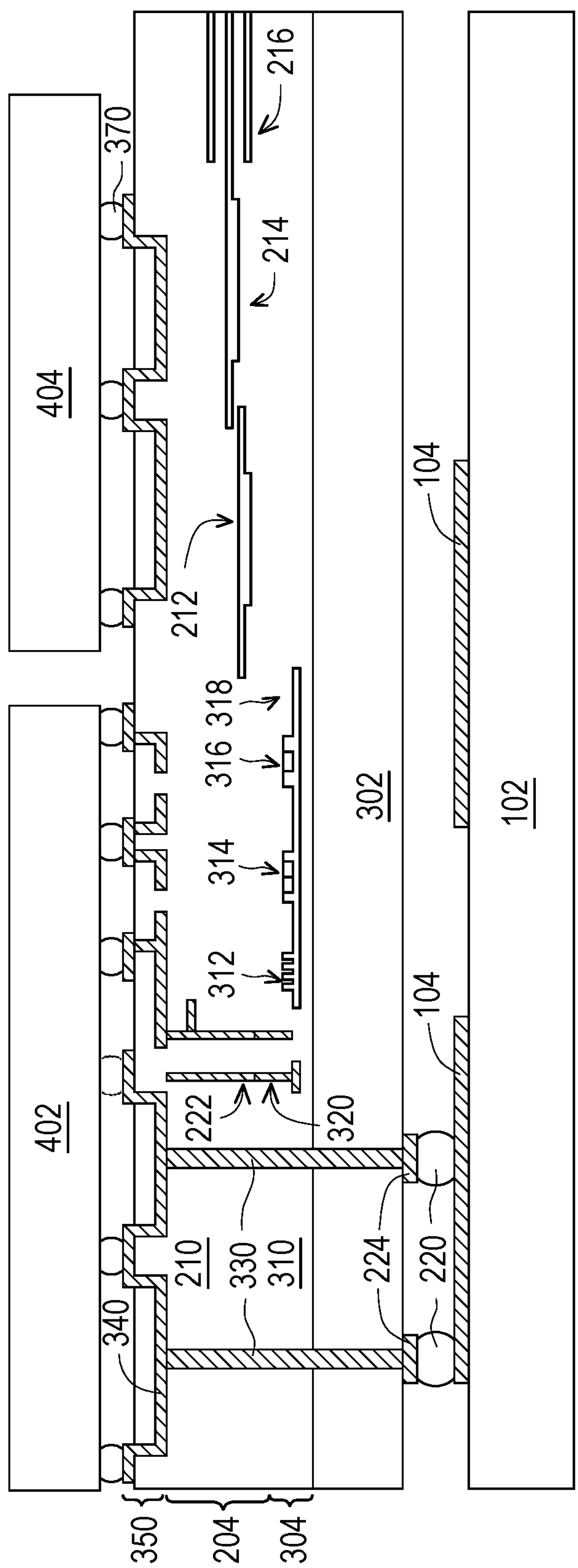

At operation 912, the method 900 (FIG. 23) attaches the assembly resulted from the operation 910 to a substrate 102, such as shown in FIG. 29. This is substantially the same as operation 720 discussed above.

Other features and processes may also be included in the embodiments discussed above. For example, testing structures may be included to aid in the verification testing of the semiconductor structure 100. The testing structures may include, for example, test pads formed in the RDL 350 that allow the testing of the semiconductor structure 100, the use of probes and/or probe cards, and the like. The verification testing may be performed on intermediate structures as well as the final structure. Additionally, the structures and methods disclosed herein may be used in conjunction with testing methodologies that incorporate intermediate verification of known good dies (or known good device layers) to increase the yield and decrease costs.

Although not intended to be limiting, one or more embodiments of the present disclosure provide many benefits to semiconductor devices and manufacturing, such as three-dimensional integrated circuits or systems having optical devices. For example, embodiments of the present disclosure provide an optical interposer that can be used in three-dimensional integrated circuits or systems. The optical interposer provides opto-electronic devices along with waveguides. In various embodiments, interfaces between the optical interposer and dies attached thereon are electrical only, which enables flexible integration of the optical interposer and the dies using existing or future-developed bonding methods. The disclosed structures and methods can be easily integrated into existing semiconductor (such as CMOS) manufacturing processes.

In an example aspect, the present disclosure is directed to a semiconductor structure that includes an optical interposer having at least one first photonic device in a first dielectric layer and at least one second photonic device in a second dielectric layer, wherein the second dielectric layer is disposed above the first dielectric layer. The semiconductor structure further includes a first die disposed on the optical interposer and electrically connected to the optical interposer; a first substrate under the optical interposer; and conductive connectors under the first substrate.

In an embodiment, the semiconductor structure further includes vias going through the first and the second dielectric layers and the first substrate and electrically connected to the conductive connectors. In some embodiments of the semiconductor structure, the optical interposer further includes a redistribution layer on the second dielectric layer. In some embodiments, the at least one first photonic device includes a silicon nitride-based photonic device. In a further embodiment, the at least one second photonic device includes a modulator, a photo detector, a waveguide, or a grating coupler.

In some embodiments, interfaces between the optical interposer and the first die are free of optical interfaces. In some embodiments, the semiconductor structure further includes a base substrate under the first substrate, wherein the conductive connectors electrically couple the first substrate to the base substrate. In some embodiments, the semiconductor structure further includes a fiber array coupled to the at least one first photonic device on a side of the optical interposer.

In some embodiments, the semiconductor structure further includes at least one third photonic device in the second dielectric layer, wherein the at least one second photonic device includes a first photonic modulator, the at least one third photonic device includes a first photo detector, and the first photonic modulator is optically coupled to the first photo detector. In a further embodiment, the at least one second photonic device further includes a second photo detector and the at least one third photonic device further includes a second photonic modulator, wherein the second photonic modulator is optically coupled to the second photo detector. In another further embodiment, the semiconductor structure further includes a second die disposed on the optical interposer and electrically connected to the optical interposer, wherein the first photonic modulator is electrically coupled with the first die, and the first photo detector is electrically coupled with the second die.

In another example aspect, the present disclosure is directed to a semiconductor structure that includes an optical interposer. The optical interposer includes a first dielectric layer and a second dielectric layer on the first dielectric layer, first photonic devices in the first dielectric layer, second photonic devices in the second dielectric layer, and a redistribution layer on the second dielectric layer, wherein the second dielectric layer is between the first dielectric layer and the redistribution layer. The semiconductor structure further includes first and second dies disposed on the redistribution layer, wherein the first and the second dies are electrically connected to the redistribution layer. The semiconductor structure further includes a first substrate under the first dielectric layer, conductive connectors under the first substrate, and vias going through the first and the second dielectric layers and the first substrate and electrically coupling the redistribution layer to the conductive connectors.

In an embodiment of the semiconductor structure, the first photonic devices include a silicon nitride-based waveguide, and the second photonic devices include a photonic modulator, a photo detector, a waveguide, a grating coupler, or a combination thereof. In another embodiment, connections between the optical interposer and the first and the second dies are electrical connections and are free of optical connections.

In an embodiment, the semiconductor structure further includes an organic base substrate under the first substrate, wherein the conductive connectors electrically couple the first substrate to the organic base substrate. In another embodiment, the first die and the second die are optically coupled to each other through the first photonic devices and the second photonic devices.

In yet another example aspect, the present disclosure is directed to a method that includes providing a first structure having a first substrate and a first layer on the first substrate, wherein the first layer includes a waveguide and one of a modulator and a photo detector in a first dielectric material. The method further includes bonding the first structure to a carrier; removing the first substrate from the first structure; and providing a second structure having a second substrate and a second layer on the second substrate, wherein the second layer includes a silicon nitride-based photonic device in a second dielectric material. The method further includes bonding the first layer to the second layer; removing the carrier; forming vias through the first layer, the second layer, and the second substrate; forming a redistribution layer on the first layer; attaching one or more dies on the redistribution layer; and attaching the second substrate to a base substrate.

In an embodiment of the method, the first and the second dielectric materials both include silicon dioxide and the bonding of the first layer to the second layer uses oxide-oxide bonds. In another embodiment, the one or more dies are attached to the redistribution layer using conductive connectors. In yet another embodiment, the second substrate is attached to the base substrate using conductive connectors.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor structure, comprising:

an optical interposer including at least one first photonic device in a first dielectric layer and at least one second photonic device in a second dielectric layer, wherein the second dielectric layer is disposed above the first dielectric layer, and wherein the first and second dielectric layers form a contiguous interface that laterally spans regions of the optical interposer that include the at least one first photonic device and the at least one second photonic device disposed respectively below and above the contiguous interface;

a first die disposed on the optical interposer and electrically connected to the optical interposer;

a first substrate under the optical interposer; and conductive connectors under the first substrate.

2. The semiconductor structure of claim 1, further comprising:

vias going through the first and the second dielectric layers and the first substrate and electrically connected to the conductive connectors.

3. The semiconductor structure of claim 1, wherein the optical interposer further includes a redistribution layer on the second dielectric layer.

4. The semiconductor structure of claim 1, wherein the at least one first photonic device includes a silicon nitride-based photonic device.

5. The semiconductor structure of claim 4, wherein the at least one second photonic device includes a modulator, a photo detector, a waveguide, or a grating coupler.

6. The semiconductor structure of claim 1, wherein interfaces between the optical interposer and the first die are free of optical interfaces.

7. The semiconductor structure of claim 1, further comprising:

a base substrate under the first substrate, wherein the conductive connectors electrically couple the first substrate to the base substrate.

8. The semiconductor structure of claim 1, further comprising:

a fiber array coupled to the at least one first photonic device on a side of the optical interposer.

9. The semiconductor structure of claim 1, further comprising:

at least one third photonic device in the second dielectric layer, wherein the at least one second photonic device includes a first photonic modulator, the at least one third photonic device includes a first photo detector, and the first photonic modulator is optically coupled to the first photo detector.

10. The semiconductor structure of claim 9, wherein the at least one second photonic device further includes a second photo detector, the at least one third photonic device further includes a second photonic modulator, wherein the second photonic modulator is optically coupled to the second photo detector.

11. The semiconductor structure of claim 9, further comprising:

a second die disposed on the optical interposer and electrically connected to the optical interposer, wherein the first photonic modulator is electrically coupled with the first die, and the first photo detector is electrically coupled with the second die.

12. A semiconductor structure, comprising:

an optical interposer including a first dielectric layer and a second dielectric layer on the first dielectric layer, first photonic devices in the first dielectric layer, second photonic devices in the second dielectric layer, and a redistribution layer on the second dielectric layer, wherein the second dielectric layer is between the first dielectric layer and the redistribution layer, and wherein the first and second dielectric layers form a contiguous interface that laterally spans regions of the optical interposer that include the first photonic devices and the second photonic devices disposed respectively below and above the contiguous interface;

first and second dies disposed on the redistribution layer, wherein the first and the second dies are electrically connected to the redistribution layer;

a first substrate under the first dielectric layer;

conductive connectors under the first substrate; and vias going through the first and the second dielectric layers and the first substrate and electrically coupling the redistribution layer to the conductive connectors;

wherein the second photonic devices include a photonic modulator, a photo detector, a grating coupler, or a combination thereof.

13. The semiconductor structure of claim 12, wherein the first photonic devices include a silicon nitride-based waveguide, and wherein the second photonic devices further include a waveguide.

14. The semiconductor structure of claim 12, wherein connections between the optical interposer and the first and the second dies are electrical connections and are free of optical connections.

15. The semiconductor structure of claim 12, further comprising:

an organic base substrate under the first substrate, wherein the conductive connectors electrically couple the first substrate to the organic base substrate.

16. The semiconductor structure of claim 12, wherein the first die and the second die are optically coupled to each other through the first photonic devices and the second photonic devices.

17. A semiconductor structure, comprising:

an optical interposer including at least one first photonic device in a first dielectric layer and at least one second photonic device in a second dielectric layer, wherein the second dielectric layer is disposed above the first dielectric layer;

a first die disposed on the optical interposer;

a redistribution layer of the optical interposer connected to the first die, wherein the redistribution layer is over the second dielectric layer;

a substrate under the optical interposer; and conductive connectors extending from a bottom of the substrate;

wherein the first die and the optical interposer are exclusively connected by electrical connections.

18. The semiconductor structure of claim 17, wherein the first dielectric layer and the second dielectric layer both include silicon dioxide and a bonding of the first dielectric layer to the second dielectric layer uses oxide-oxide bonds.

19. The semiconductor structure of claim 17, further comprising: a second die disposed on the optical interposer, wherein the second die is connected to the redistribution layer.

20. The semiconductor structure of claim 17, further comprising:

vias going through the first dielectric layer and the second dielectric layer and the substrate and connecting the redistribution layer to the conductive connectors.

* * * * *